US006583978B2

(12) United States Patent
Rostron et al.

(10) Patent No.: US 6,583,978 B2
(45) Date of Patent: *Jun. 24, 2003

(54) LIMITED RESTRIKE ELECTRIC POWER CIRCUIT INTERRUPTER SUITABLE FOR USE AS A LINE CAPACITOR AND LOAD SWITCH

(75) Inventors: Joseph R. Rostron, McDonough, GA (US); Cary J. Ahrano, McDonough, GA (US); Brian J. Berner, Anderson, SC (US)

(73) Assignee: Southern States, Inc., Hampton, GA (US)

( * ) Notice: Subject to any disclaimer, the term of this patent is extended or adjusted under 35 U.S.C. 154(b) by 93 days.

This patent is subject to a terminal disclaimer.

(21) Appl. No.: 09/882,856

(22) Filed: Jun. 15, 2001

(65) Prior Publication Data

US 2002/0050484 A1 May 2, 2002

Related U.S. Application Data

(63) Continuation of application No. 09/448,198, filed on Nov. 23, 1999.

(60) Provisional application No. 60/143,837, filed on Jul. 14, 1999.

(51) Int. Cl.[7] .................................................. H02H 9/00

(52) U.S. Cl. ............................ 361/117; 361/2; 361/56; 361/15

(58) Field of Search ........................... 361/2, 8, 13, 15, 361/115, 56, 117

(56) References Cited

U.S. PATENT DOCUMENTS 4,700,256 A * 10/1987 Howell ....................... 361/13
5,353,186 A * 10/1994 Ruoss et al. ................ 361/117
6,316,742 B1 * 11/2001 Rostron et al. ............... 218/84

* cited by examiner

*Primary Examiner*—Stephen W. Jackson
(74) *Attorney, Agent, or Firm*—Mehrman Law Office, PC; Michael J. Mehrman, Esq

(57) ABSTRACT

An actuator mechanism that decreases the time needed to move the contacts of a circuit interrupter between a closed circuit position and an open circuit position to reduce the probability of the occurrence of restrikes. The actuator mechanism uses a toggle spring arrangement that uses a single spring to move the interrupter through both an opening stroke and a closing stroke. The interrupter is designed to connect to the circuit in parallel, so that the interrupter is not normally in the circuit when the circuit is closed. Because the interrupter is not normally in the circuit, it can be manufactured to less stringent standards than those that apply to electrical components that normally remain in the circuit. The interrupter is well adapted for use as a puffer-type interrupter in which the contacts of the interrupter are contained in an arc-extinguishing gas, such as sulphur-hexaflouride ($SF_6$) gas to further reduce the probability of restrikes and to minimize the effect of occurring restrikes. The interrupter has a bellows arrangement that provides a seal to contain the sulphur-hexaflouride ($SF_6$) gas while allowing the actuator mechanism to freely operate without deterioration of interrupter components. The bellows arrangement enables the interrupter to be utilized in capacitor switching applications in which frequent switching is required. The interrupter may also include a voltage-clamping device connected in parallel across the contacts of the circuit interrupter.

7 Claims, 21 Drawing Sheets

1010
1012
1008
1002
100

1020
CAPACITOR BANK
OR
TRANSMISSION LINE
1022
1006
1008
1002
100

1000
100
1006
1002
1008

LIMITED RESTRIKE ELECTRIC POWER CIRCUIT INTERRUPTER SUITABLE FOR USE AS A LINE CAPACITOR AND LOAD SWITCH

REFERENCE TO RELATED APPLICATION

This application is a continuation of Ser. No. 09/448,198 filed Nov. 23, 1999 which claims priority to commonly-owned U.S. Provisional Patent Application No. 60/143,837, filed Jul. 14, 1999.

TECHNICAL FIELD

The present invention relates to electric power circuit interrupters and, more particularly, relates to a circuit interrupter with limited restrike capability suitable for use as a line capacitor and load switch. The interrupter, which is disconnected from the circuit in normal operation, includes a bidirectional freewheeling toggle mechanism and a bellows around a relatively slow moving actuator shaft to minimize wear and tear imposed on the interrupter through repetitive cycles.

BACKGROUND OF THE INVENTION

A circuit interrupter is a disconnect switch used to periodically disconnect and reconnect an electrical power transmission, sub-transmission or distribution line from a connected device, such as a load, a line capacitor, a voltage regulator, or another type of device. Circuit interrupters typically include two or more contacts that are in physical contact with one another when the electric power line is connected to the switched device, and that are physically separated when the line is disconnected from the switched device. The interrupter is said to be in the "closed position" when the contacts are in contact with each other, and in the "open position" when the contacts are separated.

For an electric power line that carries high voltage and/or high current, it is desirable to open the male and female contacts quickly to avoid a restrike, in which the electric current arcs across a physical gap between the contacts. Restrikes impose high current spikes and serious voltage disturbances on the power line, and can also physically degrade the components of the interrupter, especially the contacts. These current spikes and voltage disturbances can also damage other pieces of equipment connected to the power line. Sensitive loads, such as computers and other electronic devices, are particularly vulnerable to this type of damage. Generally, the wider the arc gap during a restrike, the higher the voltage required to breakdown the gap, and the larger the current spike and the associated risk of damage.

Restrikes occur when the interrupter's contacts are not in physical contact, but are still close enough to each other to permit electric current to arc through the air or other media between the contacts. When the contacts of a properly designed circuit interrupter are fully separated, the distance between the contacts is sufficient to prohibit restrikes. However, a restrike can occur as the contacts are moved through an "opening stroke" from the fully connected or closed position to the fully separated position or open position. Likewise, an arc can occur across a gap between the contacts as the contacts are moved through a "closing stroke" from the open position to the closed position. However, arcs during a closing stroke are less dangerous to the electric system because the current in the circuit is zero prior to reconnection, which greatly reduces the current spike caused by the arc. Nevertheless, for safety reasons it may desirable to control the arcs during reconnection of the circuit interrupter.

Restrikes typically occur because once the circuit is opened at a zero voltage crossing, there is a rapid rise in voltage across the contacts known as the "transient recovery voltage." If the interrupter's contacts are not separated quickly enough for the gap between the contacts (the "arc gap") to withstand this rising voltage, then the gap breaks down and the current flow arcs across the gap and results in a restrike. A first restrike generally occurs at or near the point when the transient recovery voltage reaches its maximum value, which is typically one-quarter of a cycle from the zero voltage crossing when the circuit was initially opened. Thus, to prevent a restrike, the contacts must be moved from the closed position to a position at which a restrike is impossible within one-quarter of a cycle.

On an opening stroke in which the arc gap increases quickly, a second restrike is much more severe than the first because the arc gap is much larger. For this reason, in certain applications a maximum of one restrike is permitted. To meet this one-restrike-maximum, the contacts must be moved from the fully connected position to a position at which a restrike is impossible within three-quarters of a cycle. In particular, governmental regulations and municipal codes generally permit a maximum of one restrike per transmission or distribution line disconnection. Thus, the actuator mechanism of a typical interrupter must be capable of opening the contacts at a separation velocity sufficient to prevent multiple restrike (i.e., more than one) once the initial arc extinction occurs at a current zero.

Usually, a human operator of an interrupter cannot create enough energy to separate the contacts of an interrupter in a short enough time without a mechanical advantage. Thus, separation velocity is typically provided by an actuator mechanism, usually a spring arrangement, in the circuit interrupter. A typical spring arrangement stores potential energy in a spring-type actuator mechanism and then releases the spring energy abruptly to produce the desired separation velocity. Of course, higher separation velocity can often be accomplished by a more robust actuator mechanism. However, the designer of the circuit interrupter is also concerned with the cost and durability of the resulting device.

The designer therefore takes the intended use of the circuit interrupter into account when designing the circuit interrupter. For example, disconnection is often required to perform maintenance on the electrical power line or on a device connected to the line downstream from the disconnect switch, such as a transformer or voltage regulator. A disconnect capability may also be required for fault protection. A conventional circuit breaker is typically used as the circuit interrupter for these applications. In this application, the circuit breaker can be expected to cycle several dozen or a hundred or so times over its life span.

Line capacitor switches, on the other hand, can be expected to cycle much more frequently. This is because a line capacitor is typically switched into connection with the electric power line to correct the power factor during high-load periods. The line capacitor is later switched out of the circuit when the load drops and the power factor correction afforded by the capacitor is no longer needed. Because electric power loads typically peak on a daily or twice-daily basis, capacitor switches typically cycle on a daily or twice-daily basis. In addition, certain types of industrial loads, such as coal mines and arc furnaces, often impose peak loads many times each day. Therefore, a capacitor switch can be expected to cycle hundreds or thousands of times over its life span. A load switch, which is typically used to disconnect a discrete distribution voltage load such as customer-owned device or premises, may also experience hundreds or thousands of cycles over a lifetime.

In addition, it is economically feasible to design very expensive transmission voltage circuit breakers to provide fault protection for the transformer, which is a very expensive device. In addition, multiple restrikes at very high voltages can damage the transformer and other connected devices. Transmission voltage circuit breakers have therefore been designed with very robust actuator mechanisms, "penetrating contacts" (e.g., a male "pin" contact and a female "tulip" contact) that fit into each other, sealed chambers that surround the penetrating contacts with a dielectric gas that quenches the arcs within "arc gaps" between the contacts, and nozzles that direct the dielectric gas into the arc gaps as the penetrating contacts separate. Although these features are very effective at minimizing restrikes, they have traditionally been too expensive to be feasible for inclusion in sub-transmission and distribution voltage devices, such as capacitor and load switches.

Conventional circuit breakers have a number of other attributes that make them unsuitable as capacitor or load switches. First and most importantly, circuit breakers are not designed to withstand the hundreds or thousands of cycles that capacitor and load switches must withstand. For example, circuit breakers typically include "stop" mechanisms for charging and then abruptly releasing spring energy. These stop mechanisms are prone to wear and tear and thus limit the durability of the circuit breaker. Bellows placed around high-speed actuators to seal the dielectric gas chambers are also prone to wear and tear through repetitive cycling of the breaker. A circuit breaker would therefore break down far to quickly to be cost effective if used as a capacitor switch. Second, circuit breakers are normally operated as series-connected devices, which raises their cost as compared to disconnect switches that are normally disconnected from the circuit and only conduct current when temporarily connected during disconnect operations. Third, circuit breakers typically include separate actuator mechanisms for opening and closing the breaker, which also raises their cost as compared to a disconnect switch that includes a single actuator mechanism.

Electric switchgear manufacturers have developed circuit interrupters for sub-transmission and distribution applications that overcome some of these disadvantages. For example, normally disconnected circuit interrupters have been developed for use as capacitor and load switches. However, these devices are not designed to prevent restrikes, but instead include a series connected cascade of sacrificial "butt" contacts that are designed to deteriorate over time as a result of restrikes. The deterioration of the contacts requires regular maintenance to monitor and replace the contacts as they deteriorate, and thus increases the cost of using this type of circuit interrupter. These devices are also prone to cascading failures when one of the butt contacts deteriorates to the point of malfunction. These circuit interrupters are also designed to control the arc only on the opening stroke, and typically conduct an uncontrolled arc through air on the closing stroke.

Although transmission voltage circuit breakers are available with penetrating contacts, dielectric gas chambers, and actuators that accelerate the penetrating contacts to quench arcs between the contacts within the dielectric chambers during circuit opening, these features are not presently available in sub-transmission or distribution devices, such as capacitor and load switches. Moreover, circuit breakers with these features are not presently designed to be economical enough to serve as capacitor or load switches. Available capacitor and load switches, on the other hand, are not presently designed to avoid multiple restrikes or to accelerate their contacts to control the resulting arcs on both the opening and closing strokes. The limited durability of conventional capacitor switches with sacrificial contacts also limits their feasibility for many applications.

Therefore, there is a need for a circuit interrupter that prevents or limits restrikes, and that is durable enough to be used as a capacitor and load switch. There is a further need for a normally disconnected capacitor switch that controls the arc on both the opening and closing strokes. There is also a need for more durable and cost effective capacitor and load switch designs.

SUMMARY OF THE INVENTION

The circuit interrupter of the present invention meets these needs in circuit interrupter that includes many of the features of conventional circuit breakers, including a plunging contactor, a dielectric gas chamber, and an actuator mechanism that accelerates the plunging contactor during circuit opening. Unlike conventional circuit breakers, however, the circuit interrupter of the present invention includes these features in a normally disconnected device that opens and closes the circuit in response to physical movement of a conventional disconnect switch blade arm. These attributes allow the circuit interrupter to operate as a normally disconnected sub-transmission or distribution voltage disconnect switch.

In addition, the circuit interrupter includes a number of features that improve its operation over conventional circuit breakers or disconnect switches. These features improve the durability of the circuit interrupter and allow it to quench arcs within the dielectric gas chamber on both opening and closing strokes, which improves the operation of the device as a capacitor and load switch. In particular, the circuit interrupter includes a bidirectional freewheeling toggle mechanism that stores and then abruptly releases spring energy to accelerate the plunging contactor on both the opening and closing strokes. This allows the circuit interrupter to quench arch within the dielectric gas chamber on only the opening stroke, or on both the opening and closing strokes. This improves the safety of the circuit interrupter while allowing the device to avoid multiple restrikes on only the opening stroke, or on both the opening and closing strokes.

The freewheeling toggle mechanism improves the durability of the circuit interrupter as compared to conventional designs with stops that allow a spring to store and then release spring energy. The circuit interrupter also includes a bellows to seal the dielectric gas chamber around a relatively slow moving actuator shaft to minimize wear and tear imposed on the interrupter through repetitive cycles. The circuit interrupter may also be positioned so that the actuator arm meets the spacing requirements of electric codes, which allows the blade arm of a conventional disconnect switch to trigger the circuit interrupter on both the opening and closing strokes. These characteristics make the circuit interrupter particularly well suited to operation as a capacitor or load switch.

The circuit interrupter may also include a voltage-clamping device, such as a metal-oxide varistor, connected in parallel across the contacts of the interrupter. The "break down" or "trip" voltage for the voltage-clamping device is typically set at or near one per-unit (i.e., the maximum system voltage), which causes the voltage-clamping device to conduct electricity whenever the voltage across the interrupter exceeds the maximum system voltage. In this configuration, the parallel-connected voltage-clamping device may operate to discharge a capacitive load switched by the circuit interrupter. In addition, by limiting the voltage across the circuit interrupter, the parallel-connected voltage-clamping device prevents restrikes from occurring within the circuit interrupter when the voltage across the interrupter during operation would otherwise exceed the no-restrike design voltage of the interrupter. For example, the parallel-connected voltage-clamping device may prevent restrikes from occurring within the circuit interrupter during capacitor switching, when the voltage across the interrupter would approach two per-unit (i.e., double the maximum system voltage) if the voltage-clamping device was not present, and the two per-unit voltage level exceeds the no-restrike design voltage of the interrupter.

Generally described, the invention may be employed as an interrupter for an electric power circuit. A plunging contactor having first and second contacts moves in an opening stroke from a closed position to an open position to electrically open the circuit, and in a closing stroke from the open position to the closed position to reset the interrupter. A bidirectional freewheeling toggle mechanism stores and abruptly releasing spring energy to accelerate movement of the plunging contactor in both the opening and closing strokes. In addition, an actuator arm moves the toggle mechanism and thereby causes the toggle mechanism to store and then abruptly release the spring energy in both the opening and closing strokes. The freewheeling toggle mechanism may include a single spring that drives the toggle mechanism in both the opening and closing strokes.

The interrupter may also include a sealed interrupter chamber filled with a dielectric gas, such as sulphur-hexaflouride ($SF_6$) gas. In this case, the plunging contactor is located within the dielectric gas chamber and a piston forces a flow of the dielectric gas into an arc gap defined by a separation between the first and second contacts on both the opening and closing strokes. The gas flow is enhanced by a nozzle that directs the flow into the arc gap at a predetermined distance from the first or second contact, such as 1.5 inches. In particular, the toggle mechanism typically accelerates the plunging contactor to a separation velocity of at least about 100 inches per second when then arc gap reaches 1.5 inches during the opening stroke. On the closing stroke, the toggle mechanism accelerates the plunging contactor to a reconnection velocity of at least about 80 inches per second when then arc gap reaches 1.5 inches.

When the interrupter operates as a disconnect switch, the actuator arm is positioned to be movable from an initial position (i.e., lowered in a typical disconnect switch configuration) to an opposing position (i.e., raised in a typical disconnect switch configuration) by a conventional disconnect switch blade arm as the blade arm moves from a closed position (i.e., lowered in a typical disconnect switch configuration) to an open position (i.e., raised in a typical disconnect switch configuration) to trigger the opening stroke of the plunging contactor. When the blade arm is in the closed position, it electrically connects to a jaws to provide a first electric path for the circuit path.

During a first portion of the movement from the closed position to the open position and before electrically disconnecting from the jaws, the blade arm electrically connects to the actuator arm, which is electrically connected to the plunging contactor, to provide a second electric path for the circuit through the plunging contactor in parallel with the first electric path through the jaws. Then, during a second portion of the movement from the closed position to the open position, the blade arm electrically disconnects from the jaws and remains in electrical connection with the actuator arm to connect a series electrical path for circuit through the plunging contact.

In addition, the toggle mechanism is configured, before accelerating the plunging contactor to open the circuit during the opening stroke, to allow the blade arm to move through a sufficient distance to prevent the circuit from arcing between the blade arm and the jaws in response to separation of the first and second contacts. This causes an arc to be drawn and extinguished between the first and second contacts within the sealed interrupter chamber during the opening stroke. In one alternative, after completion of the opening stroke and upon reaching the opposing position, a counter weight connected to the actuator arm causes the actuator arm to automatically return to its initial position. This causes the plunging contactor to moved through the closing stroke to reset the interrupter.

In another alternative, after completion of the opening stroke and before the blade arm reaches the open position, the actuator arm passes through the opposing position, separates from the blade arm, returns to the opposing position, and temporarily remains substantially in the opposing position. Then, as the blade arm subsequently moves from the open position to the closed position, the blade arm electrically connects with and moves the actuator arm from the opposing position to the initial position and thereby triggers the penetrating contact to move through the closing stroke. In this case, the toggle mechanism is configured to accelerate the plunging contactor to close the circuit during the closing stroke before the blade arm to moves to a position that would allow the circuit to arc between the blade arm and the jaws. This causes an arc to be drawn and extinguished between the first and second contacts within the sealed interrupter chamber during the closing stroke.

The blade arm typically pivots about a base during movement between the open and closed positions, and includes a contact area for contacting the jaws when the blade arm is in the closed position. To meet electrical code requirements, the actuator arm is positioned in the opposing position such that the minimum distance between the contact area of the blade arm and the actuator arm is at least as great as the minimum distance between the contact area and the base of the blade arm. In other words, the distance between the actuator arm and the blade arm is at least as great as the distance between the blade arm and the jaws when the blade arm is in the open position (i.e., raised in a typical disconnect switch configuration) and the actuator arm is in the opposing position (i.e., raised in a typical disconnect switch configuration).

In order to provide the required "dwell" to allow the actuator arm to trigger as desired on other the opening and closing strokes, the toggle mechanism includes a cam surface positioned between the actuator arm and a linkage mechanically coupling the actuator arm to the plunging contactor by way of the toggle mechanism. The cam surface causes the toggle mechanism to trigger the opening stroke of the plunging contactor as the blade arm moves the actuator arm from the initial position to the opposing position, and also triggers the closing stroke of the plunging contactor as the blade arm moves the actuator arm from the opposing position to the initial position, while maintaining a sufficient distance between the blade arm and the jaws to prevent the circuit from arcing between the blade arm and the jaws.

In yet another alternative, the circuit interrupter includes a voltage-clamping device connected in parallel across the contacts of the interrupter. The voltage-clamping device has a voltage-level threshold that may be selected to prevent a restrike from occurring across the contacts of the interrupter when the interrupter is operated to disconnect a capacitive load from an electric power system. For example, the electric power system may carry an AC voltage defining a maximum voltage of about one per-unit, the capacitive load may be charged to about one per-unit, and the voltage-level threshold for the voltage-clamping device may be selected to be about one per-unit. In this configuration, the parallel-connected voltage-clamping device may operate to discharge the capacitive load while limiting the voltage across the circuit interrupter to the voltage-level threshold, about one per-unit. Thus, the parallel-connected voltage-clamping device prevents restrikes from occurring within the circuit interrupter during capacitor switching, when the voltage across the interrupter would approach two per-unit if the voltage-clamping device was not present, and the two per-unit voltage level exceeds the no-restrike design voltage of the interrupter.

That the invention improves over the drawbacks of prior circuit interrupters and accomplishes the advantages described above will become apparent from the following detailed description of specific embodiments and the appended drawings and claims.

DETAILED DESCRIPTION

Figure 1A:
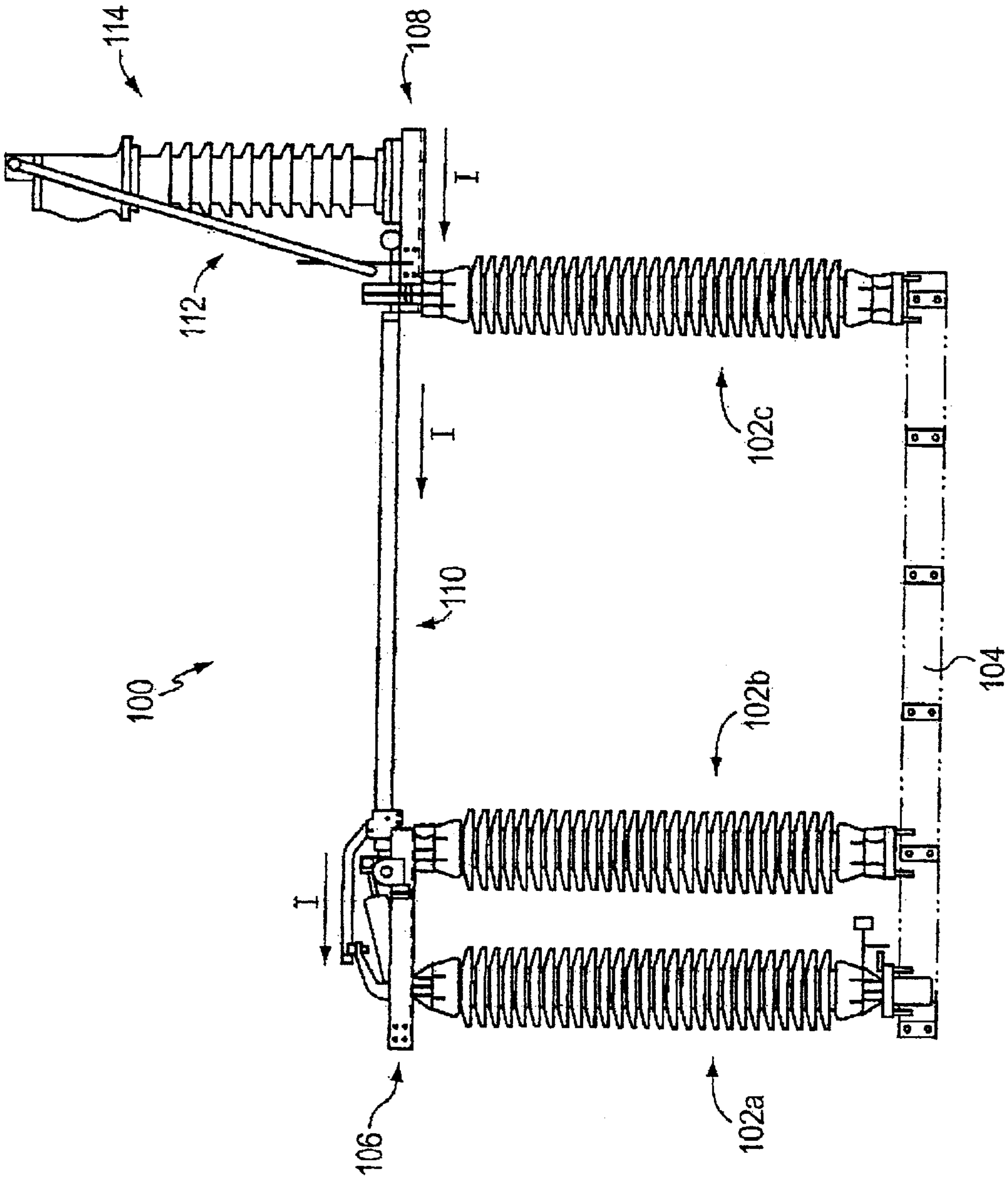
FIG. 1*a* illustrates a puffer-type circuit interrupter in a closed circuit position.

The present invention provides an actuator mechanism that reduces the time needed to move the contacts of a circuit interrupter between a closed circuit position and an open circuit position, thereby reducing the probability of restrikes. The actuator mechanism uses a toggle spring arrangement that uses a single spring to move the interrupter through both an opening stroke and a closing stroke. The interrupter is designed to connect to the circuit in parallel, so that the interrupter's contacts are not normally in the circuit when the circuit is closed. Because the contacts are not normally in the circuit, the interrupter can be manufactured to less stringent standards than those that apply to electrical components that normally remain in the circuit. The interrupter is well adapted for use as a puffer-type interrupter in which the contacts of the interrupter are contained in an arc-extinguishing gas (i.e., a dielectric gas), such as sulphur-hexaflouride ($SF_6$) gas to further reduce the probability of restrikes and to minimize the effect of occurring restrikes. The interrupter has a bellows arrangement that provides a seal to contain the $SF_6$ gas while allowing the actuator mechanism to freely operate without deterioration of interrupter components. The bellows arrangement enables the interrupter to be utilized in capacitor switching applications in which frequent switching is required.

As stated above, an exemplary embodiment of the present invention is well adapted for use as a puffer-type circuit interrupter. Generally, a puffer-type circuit interrupter provides a means for disconnecting a transmission line from a power source such that any resulting restrike is minimized by an arc-extinguishing gas (i.e., dielectric gas) such as a mixture of helium gas and sulphur-hexaflouride ($SF_6$) gas. The dielectric $SF_6$ gas is ionized as a restrike is created, absorbing the energy of the restrike. Once the restrike has been extinguished, the ions recombine rapidly to restore the $SF_6$ gas (and its dielectric properties) to its original condition.

In a puffer-type interrupter, a plunger arrangement is typically utilized to close and open the circuit by bringing a pair of opposing contacts into and out of physical and electrical connection with each other. The plunging arrangement, including the contacts, is referred to as a plunging contactor. In this kind of puffer-type interrupter, gas flow may be achieved by the relative motion of a movable contact and a stationary contact. The plunging contactor is confined within a sealed interrupter chamber, such that the movement of the moveable contact with respect to the stationary contact and the sealed interrupter chamber causes the flow of the $SF_6$ gas across the arc gap.

One means for minimizing the probability of restrike is to increase the velocity at which the interrupter's contacts are separated. Transmission lines that carry high voltage and/or high current must be disconnected quickly in order to minimize the probability of a restrike. Restrikes occur when the interrupter's contacts are not actually connected, but are still close enough to each other to permit current to be conducted through the $SF_6$ gas (or other media) between the contacts. When the contacts of a properly designed interrupter are fully separated, the distance between the contacts is sufficient to prohibit a restrike. However, a restrike can occur as the contacts are moved from the fully connected position to the fully separated position (i.e., the opening stroke), but are still within an "arc gap." The arc gap is the gap that is exists between contacts when the contacts are physically separated from one another, but are still within a distance range in which a restrike may occur. Similarly, a restrike can occur as the contacts are moved from the fully separated position to the fully connected position (i.e., the closing stroke), but are still within the arc gap.

A human interrupter operator is typically incapable of generating enough energy to separate and/or reconnect the contacts at the desired velocity. Thus, interrupters generally utilize an actuator mechanism such as a spring arrangement to move the contacts. One function of the separation mechanism is to enable the contacts to be separated and reconnected at a velocity greater than that of which a human operator of the interrupter is capable. The human operator typically initiates a separation procedure by turning a lever on the interrupter. As the lever is turned by the operator, a spring arrangement is energized until it reaches an energy level capable of overcoming the inertia of the stationary interrupter in its closed circuit position. When this energy level is reached, the potential energy in the spring is converted to kinetic energy and the contacts are moved apart by the spring arrangement.

Similarly, the human operator typically initiates a reconnect procedure by turning the lever on the interrupter. As the lever is turned by the operator, the spring arrangement is energized until it reaches an energy level capable of overcoming the inertia of the stationary interrupter in its open circuit position. When this energy level is reached, the potential energy in the spring is converted to kinetic energy and the contacts are moved together by the spring arrangement.

A Puffer-Type Circuit Interrupter

Referring now to FIG. 1*a*, an exemplary puffer-type circuit interrupter 100 is illustrated in a closed circuit condition. The interrupter 100 is usually used in the closed circuit position. Only when the circuit must be disconnected is the interrupter 100 moved to the open circuit position. In the interrupter 100 of FIG. 1, the interrupter 100 is implemented with three insulators 102*a–c* that physically and electrically separate the interrupter 100 from a support structure 104.

In its closed circuit position, the interrupter permits current to flow through the interrupter from a power source contact 106 to a transmission line contact 108. Thus the current does not flow through the interrupter's contacts, which are contained within sealed interrupter chamber 114. Instead, the current flows through blade arm 110 and is prevented from flowing to the support structure 104 by insulators 102*a–c*. Because the interrupter's contacts are not in the circuit while the interrupter is in the closed position, the interrupter is said to be a parallel (as opposed to series) interrupter. The arrows marked "I" indicate the current flow through the interrupter in FIGS. 1*a–c*.

The disconnect procedure for opening the circuit is actuated by a drive mechanism (not shown) integrated into insulator 102*a*. The human operator initiates the disconnect procedure by means of the drive mechanism. The drive mechanism can be mechanical or electromechanical and generally comprises a manually controlled lever arm or a motor for turning the drive mechanism, thereby triggering the interrupter 100 to move to the open circuit position or to the closed circuit position.

Figure 1B:
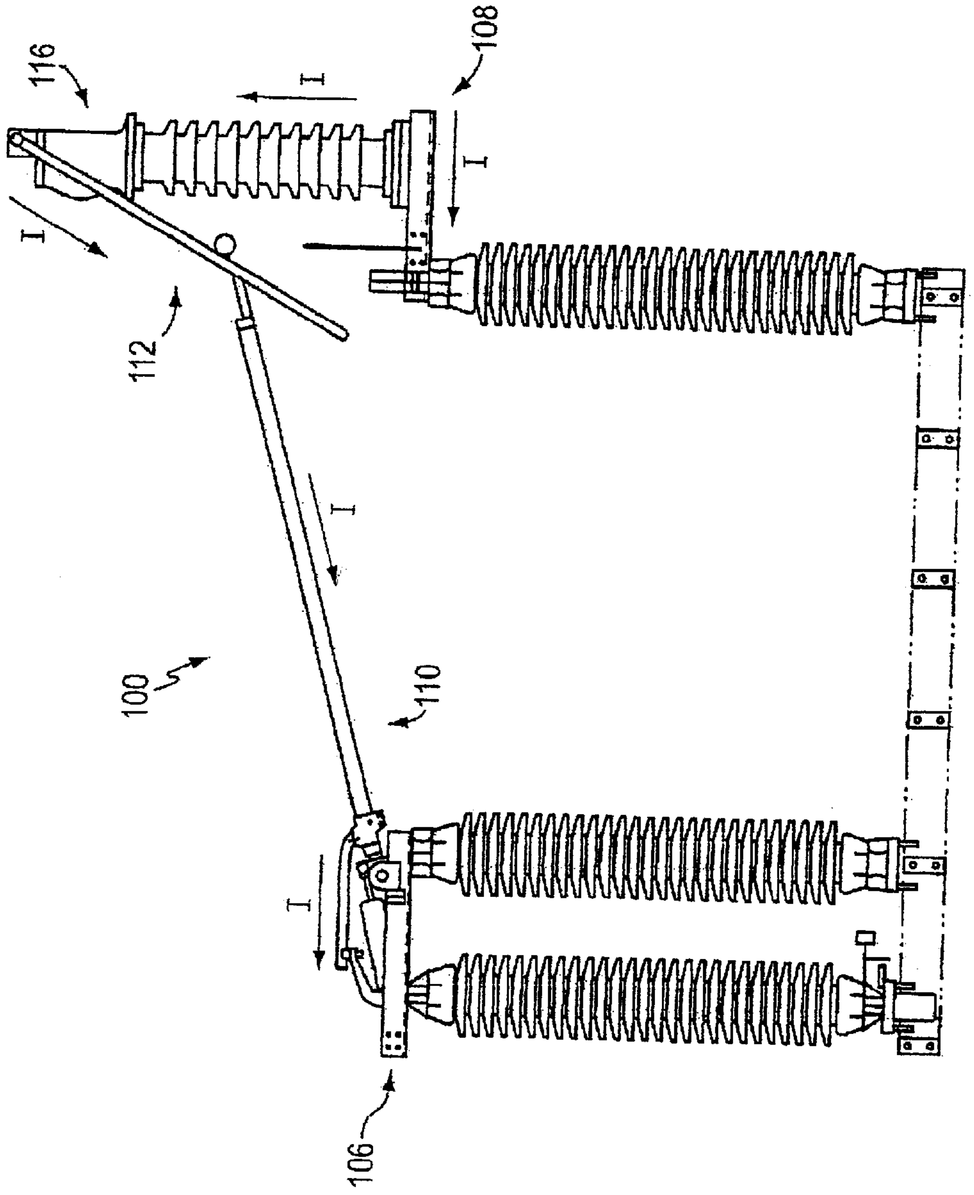
FIG. 1*b* illustrates a puffer-type circuit interrupter as it is moved from a closed circuit position to an open circuit position.

Referring now to FIG. 1*b*, the interrupter is shown as it is moved from a closed circuit position to an open circuit position (i.e., the "opening stroke"). As the drive mechanism triggers the interrupter's 100 opening stroke, the blade arm 110 is lifted away from physical contact with a jaw contact (not shown) that is in electrical contact with the transmission line contact 108. However, electrical contact between the blade arm 110 and the transmission line contact 108 is maintained through the interrupter's 100 actuator arm 112. The actuator arm 112 permits the disconnect procedure to be initiated without interrupting the flow of current between the transmission line contact 108 and the power source contact 106. Rather than interrupting the current flow, the current flow is redirected through the actuator arm 112 and through electrical contacts in the sealed interrupter chamber 114. Thus, during a portion of the opening stroke, the interrupter's contacts are connected to the circuit in series. The contacts in the sealed interrupter chamber 114 will be discussed in more detail below, in connection with FIG. 2. The arrows marked "I" illustrate the path of the current flow while the interrupter 100 is being moved from the closed circuit position to the open circuit position, but prior to the separation of the interrupter's contacts.

While the blade arm 110 is still in physical and electrical contact with actuator arm 112, the actuator arm energizes an actuator mechanism (not shown) inside the actuator housing 116. The actuator housing 116 contains the actuator mechanism that provides for the high acceleration necessary to separate the contacts as quickly as possible. Where a spring-type actuator mechanism is used, the actuator mechanism accumulates potential energy in the form of one or more energized springs. As the blade arm 110 is lifted toward vertical, it eventually raises the actuator arm 112 from an initial position (closed position) to an opposing position (open position) through a transition point. In the instant following this transition point, the interrupter's spring arrangement separates the contacts within the sealed interrupter chamber 114 and the transmission line contact 108 is electrically disconnected from the power source contact 106.

The transition point represents the instant separating the accumulation of potential energy in the spring arrangement and the conversion of the potential energy to kinetic energy by the spring arrangement. This conversion results in the triggering of the opening stroke of the interrupter 100 and the opening of the circuit. Alternatively, the actuator mechanism could be one of various other devices for separating and reconnecting the contacts at a relatively high velocity. For example, the actuator mechanism may utilize a hydraulic, pneumatic or explosive device for separating and reconnecting the contacts.

Figure 1C:
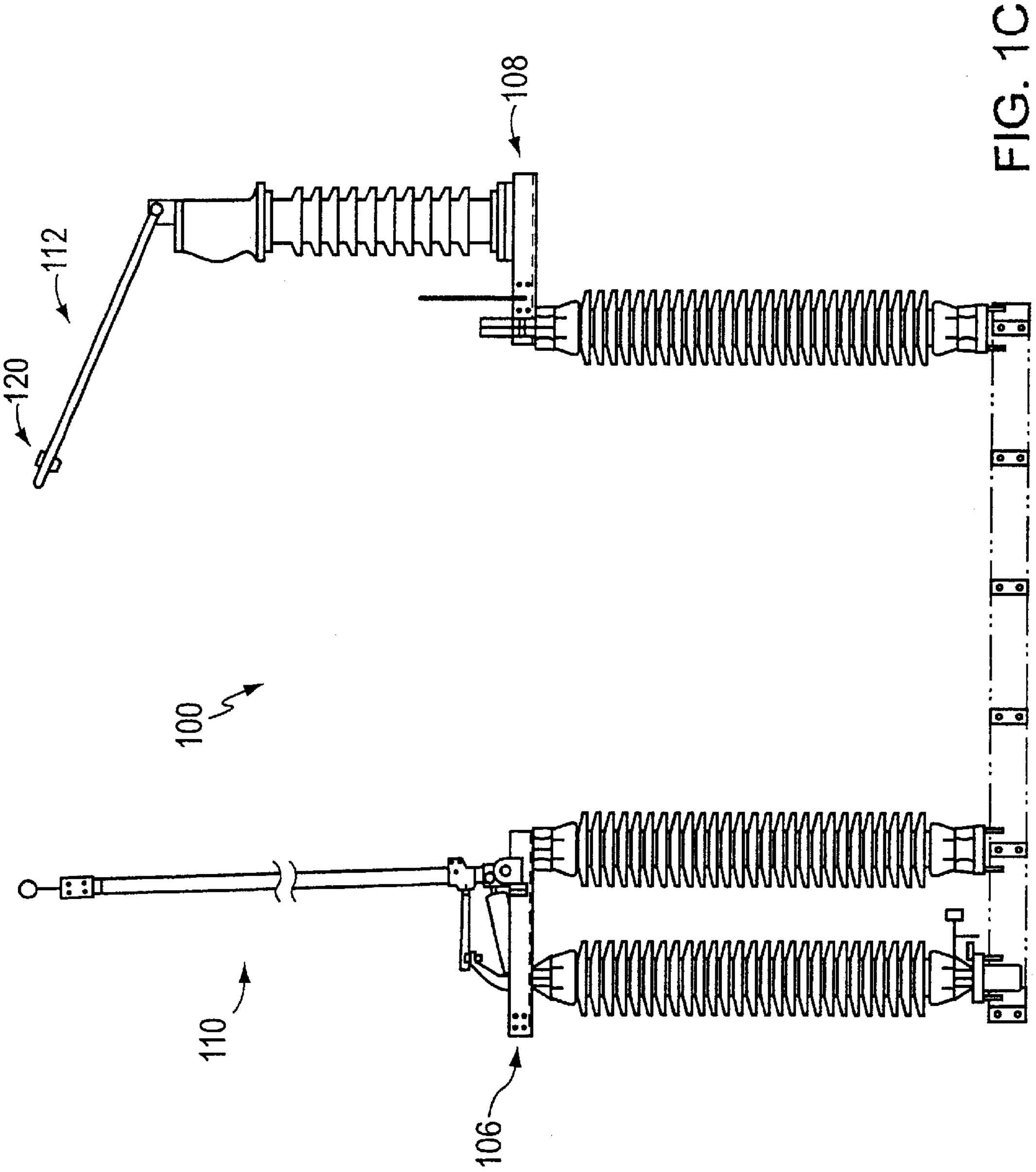
FIG. 1*c* illustrates a puffer-type circuit interrupter in an open circuit position.

Referring now to FIG. 1*c*, the interrupter 100 is shown in its open circuit position. Although the electrical connection between the transmission line contact 108 and the power source contact 106 is disconnected while the blade arm 110 and the actuator arm 112 are still in physical contact, the exemplary interrupter provides for the blade arm 110 to be placed in a vertical position. This vertical position serves as a visible indication to the human operator that the interrupter has completely disconnected the transmission line from the power source. Interrupter design constraints typically require a particular dimension of physical separation between the electrical contact of the power source and the electrical contact of the transmission line. Therefore, the interrupter 100 of FIG. 1*c* is shown in the open circuit position with the blade arm in a fully vertical position.

The interrupter 100 is also used to electrically connect the transmission line contact 108 and the power source contact 106. The blade arm 110 can be lowered by means of the drive mechanism (not shown) and eventually comes into contact with the actuator arm 112, pushing the actuator arm downward. As the actuator arm 112 is moved downward, it energizes the spring arrangement. A second transition point is reached at which the spring arrangement forces the interrupter's contacts together at a reconnection acceleration. The reconnection acceleration is greater than the acceleration capable of being generated by the human operator via the drive mechanism, but is typically less than the separation acceleration. The reconnection acceleration typically does not need to be as great as the separation acceleration, because the probability of a restrike is lower than when the circuit is at full operating current and voltage as when it is in the closed circuit position.

Following the opening stroke, the actuator arm 112 can remain in the above horizontal position depicted in FIG. 1*c* or it can be configured to return to a below horizontal position (not shown). As is shown in FIG. 1*c*, a counter weight 120 may be attached to an end of the actuator arm 112 to provide a means for bringing the actuator arm back to a below horizontal position. The actuator arm 112 may be brought low enough that it triggers the closing of the interrupter's contacts, thus resetting the interrupter. In some configurations, it may be easier for the blade arm 110 to engage the actuator arm 112 on the closing stroke, if the actuator arm is in a lower than horizontal position.

An Exemplary Interrupter Chamber and Plunging Contactor

Figure 2:
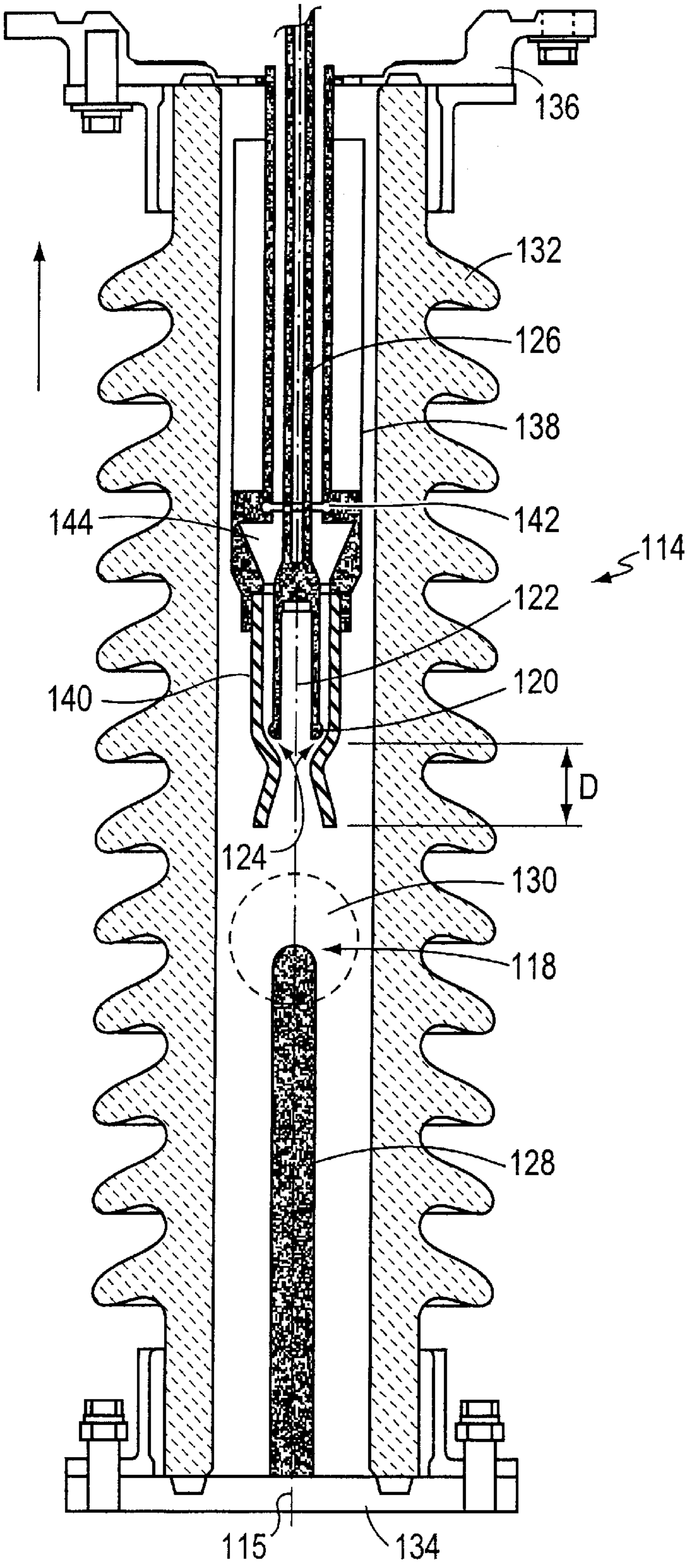
FIG. 2 illustrates an exemplary embodiment of the plunging contactor and interrupter chamber of the present invention shown in a puffer-type circuit interrupter in the open circuit position.

Having described the structure and operation of an exemplary interrupter, the details of the interrupter's sealed chamber and plunging contactor will be described in more detail with reference to FIG. 2. FIG. 2 illustrates a modified cross section of the sealed interrupter chamber 114 in the open circuit position. The cross section of the interrupter is in most respects, symmetric about the longitudinal axis 115 of the interrupter. The cross section shows a pair of contacts that are penetrating contacts wherein a male pin contact 118 is removeably engageable with a female tulip contact 120. In the closed circuit position (not shown), the tip of the pin contact 118 is located within the receiver 122 of the tulip contact 120. The interrupter's plunging contactor includes the stationary pin contact 118 and the moveable tulip contact 120. When the tulip contact 120 is moved from the open circuit position to the closed circuit position, the tulip contact receives the pin contact 118 into the tulip contact's center receiver 122. In the embodiment of FIG. 2, the plunging contactor is a penetrating contactor, wherein the tulip contact receives the pin contact 118 into the tulip contact's center receiver 122. However, the plunging contactor could include "butt" type contacts that are engageable without penetration.

The tulip contact's center receiver 122 has several spring contactors 124 arranged annularly about the tulip contact's longitudinal axis. The spring contactors 124 are biased toward the longitudinal axis of the tulip contact 120. The spring contactors 124 establish a physical and electrical contact between the tulip contact 120 and the pin contact 118 when the interrupter is in the closed circuit position. The spring contactors 124 are spread apart as the pin contact 118 enters the tulip contact 120. The spring contactors 124 are spread apart when the surface of the pin contact 118 meets the inner surfaces of the spring contactors. As the pin contact 118 protrudes further into the tulip contact 120, the inner surfaces of the spring contactors slide along the outer surface of the pin contact 118.

Various penetrating contacts have been implemented and described in the prior art. A novel penetrating contact arrangement is described and claimed in co-pending U.S. Patent Application entitled "Penetrating Electrical Contact for a Circuit Interrupter Including a Grip and Release Structure" which was filed on Nov. 23, 1999. That co-pending application is assigned to Southern States, Inc., has been assigned Ser. No. 09/448,198 and is hereby incorporated by reference. For the purposes of this discussion, those skilled in the art will appreciate that the pin and tulip contacts described herein are penetrating contacts, designed to enhance separation acceleration by having a grip and release structure for increasing the potential energy of the actuator mechanism.

The pin contact and tulip contact 120 reside within a sealed interrupter chamber 114 formed essentially by a chamber wall 132, a chamber base 134, and the actuator housing 116 (FIG. 1*b*), which is connected to the chamber at a chamber cap 136. The chamber base 134 mounts onto an interrupter base (not shown, See FIG. 8). The sealed interrupter chamber 114 can be filled with an arc-extinguishing gas such as a mixture of helium gas and sulphur-hexaflouride ($SF_6$) gas. In the exemplary puffer-type interrupter depicted in FIG. 2, a plunging contactor is typically utilized to open and close the circuit by bringing the pin contact 118 and the tulip contact 120 into and out of physical contact with each other. Gas flow may be achieved by the relative motion of a movable contact plunger 126 to which the tulip contact 120 is connected and a stationary contact structure 128 to which the pin contact 118 is connected. The plunger arrangement (i.e., the plunging contactor) is confined within the sealed interrupter chamber 114, such that the movement of the contact plunger 126 with respect to the stationary contact structure 128 and the interrupter chamber directs the flow of the $SF_6$ gas across the arc gap 130.

As the interrupter transitions from the closed circuit position to the open circuit position, the contact plunger 126 is moved in the direction of the arrow in FIG. 2. The contact plunger 126 is attached to a piston cylinder 138 which has a nozzle 140 in which the tulip contact 120 is confined. As the contact plunger 126 is moved in the direction of the arrow, the piston cylinder 138 moves in relation to a stationary piston 142. The movement of the piston cylinder 138 in relation to the piston 142 forces the $SF_6$ gas through the piston chamber 144, through the nozzle 140, and across the tulip contact 120. When the tulip contact 120 is being separated from the pin contact 118, the nozzle 140 and the tulip contact 120 will be in the arc gap 130. Thus, the arc-extinguishing $SF_6$ gas will be forced across the arc gap 130 at the time at which the probability of a restrike is greatest. The nozzle shapes the flow of the $SF_6$ gas to direct the gas into the arc gap 130. Those skilled in the art will recognize that the arc-extinguishing effect of the $SF_6$ gas on the restrike is well known in the art. The distance D between the tip of the nozzle 140 and the tip of the tulip contact 120 can be varied to tune the flow of the $SF_6$ gas across the arc gap.

The exemplary puffer-type interrupter 100 minimizes restrikes in three ways. First, it confines the restrike to the sealed interrupter chamber. Second, it provides for a flow of arc-extinguishing $SF_6$ gas across the arc gap during the period wherein the probability of restrike is greatest. Third, it provides for a high contact separation velocity and reconnection velocity. In an exemplary embodiment of the present invention, an actuator mechanism is provided which is capable of producing high separation acceleration and reconnection acceleration. An exemplary embodiment of this actuator mechanism will now be described in more detail.

An Exemplary Actuator Mechanism

Figure 3:
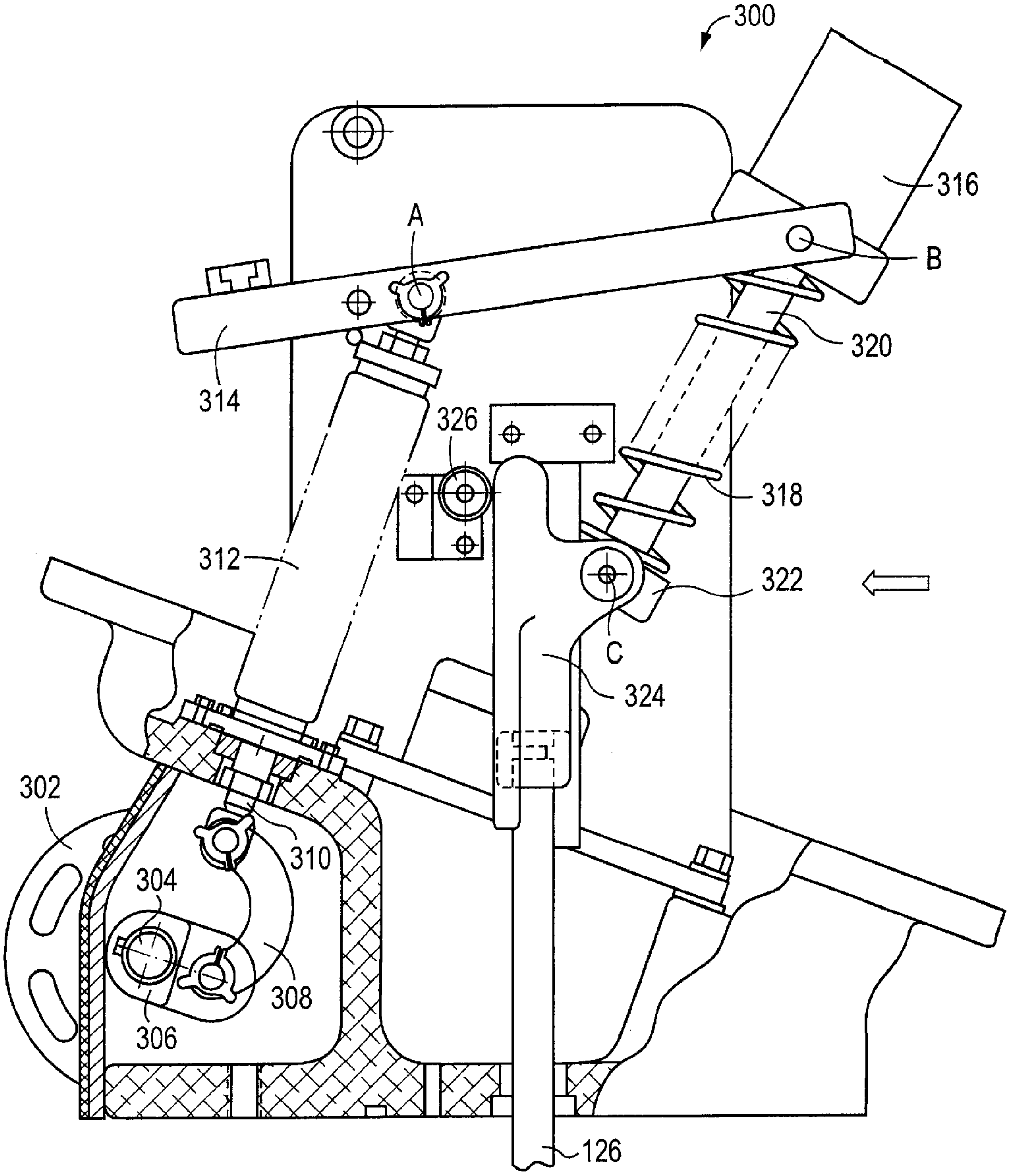
FIG. 3 illustrates a side view of an exemplary embodiment of the actuator mechanism.

Referring now to FIG. 3, a side view of the actuator mechanism 300 is shown. The actuator mechanism 300 is contained within the actuator housing 116 (FIG. 1*b*). The actuator arm 112 (FIG. 1*b*) is connected to a flywheel 302 and causes the flywheel to turn when the actuator arm is moved. The flywheel 302, is connected to a drive axle 304 which is rigidly connected to drive coupling 306. The drive coupling is pivotally connected to one end of a C-bracket 308. The other end of the C-bracket 308 is connected to an actuator shaft 310, which extends through bellows 312 and is pivotally connected to horseshoe bracket 314 at point A. The horseshoe bracket 314 is pivotally connected to a spring cap 316 at point B.

The spring cap 316 contains one end of an actuator spring 318 and is fixedly attached to a guide shaft 320. The other end of actuator spring is contained by an end cap 322. The end cap 322 is slidably engaged with the guide shaft 320 whereby the guide shaft can slide through an opening in end cap 322 (not shown). End cap 322 is pivotally attached to a plunger guide 324 at point C. The plunger guide 324 contains one end of contact plunger 126. The travel of plunger guide 324 is restricted by guide roller 326 which rolls against a surface of the plunger guide.

The position of the bellows 312 in this actuator mechanism 300 is significant. As described above in connection with FIGS. 1 and 2, a puffer-type interrupter typically has a sealed interrupter chamber which can be filled with an arc-extinguishing gas such as a mixture of helium gas and sulphur-hexaflouride ($SF_6$) gas. In conventional interrupters, the arc-extinguishing gas has been confined only to the interrupter chamber. However, in an exemplary embodiment of the present invention, the arc-extinguishing gas is allowed into the actuator housing.

In conventional interrupters, a seal is located at the opening between the interrupter chamber and the actuator housing. However, this requires a seal that permits the plunger to move, while maintaining a seal between the interrupter chamber and the actuator housing. A bellows-type seal has been used in conventional interrupters to provide a seal at the opening between the interrupter chamber and the actuator housing. Unfortunately, the plunger 126 moves at a much higher velocity than the actuator shaft 310 of the embodiment of FIG. 3. Thus, in conventional interrupters, the bellows-type seal would deteriorate quickly and the seal would fail. Advantageously, the embodiment of FIG. 3 has the bellows seal located on the actuator shaft 310. Because the actuator shaft 310 moves relatively slowly, when compared with the movement of the plunger, the bellows are subjected to much less and much slower movement.

This difference is significant, because it permits the interrupter of an exemplary embodiment of the present invention to be utilized in high-frequency switching applications, such as those requiring capacitor switching. Because the bellows is less susceptible to wear in the actuator shaft position than in the plunger position, the interrupter will not deteriorate for a longer time, permitting the interrupter to be used for many more switchings.

Figure 4:
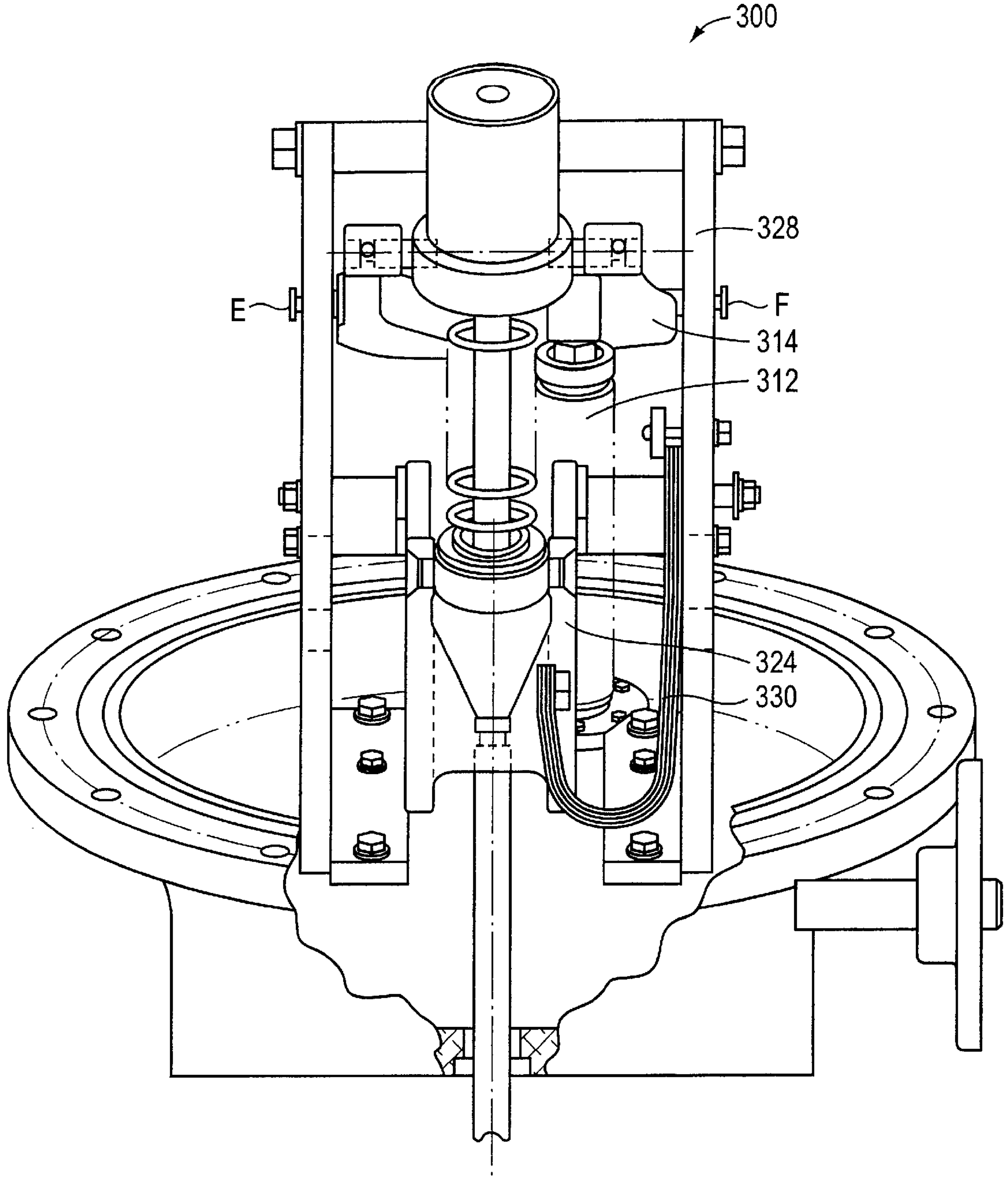
FIG. 4 illustrates a front view of an exemplary embodiment of the actuator mechanism.

Referring now to FIG. 4, a front view (from direction shown by arrow in FIG. 3) of the actuator mechanism 300 is shown. This view more clearly shows that horseshoe bracket 314 is pivotally connected at points E and F to actuator support structure 328. This view also shows electrical cable 330 which provides an electrical connection between the actuator support structure 328 and the plunger guide 326.

Figure 5:
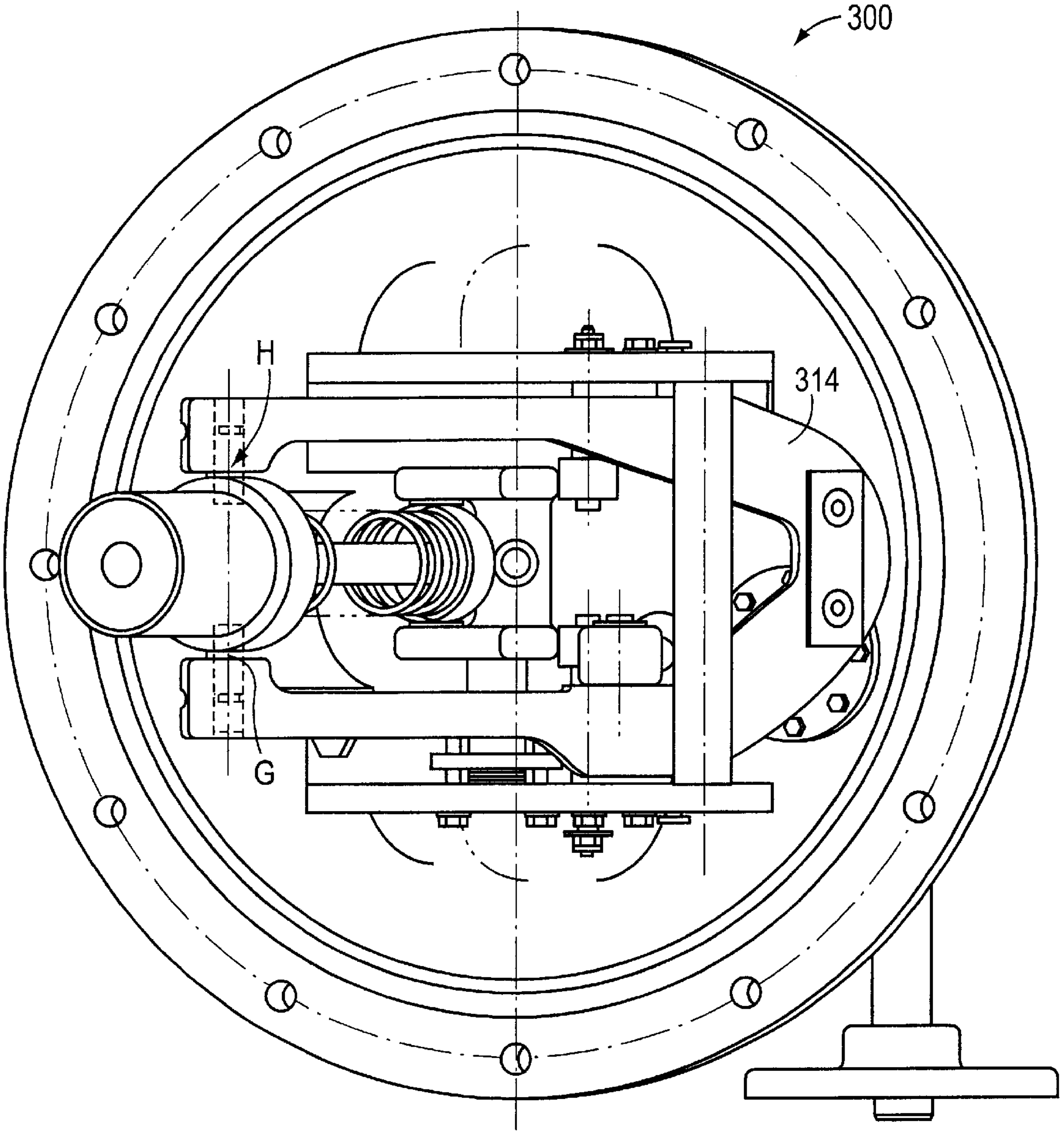
FIG. 5 illustrates a top view of an exemplary embodiment of the actuator mechanism.

Referring now to FIG. 5, a top view of the actuator mechanism 300 is shown. This figure provides a better view of the horseshoe bracket 314 and the connection between the horseshoe bracket and the spring cap 316 at points G and H. The actuator mechanism depicted in FIGS. 3–5 will be referred to as a bidirectional freewheeling toggle mechanism, because it is a spring-type toggle mechanism that provides the energy to move the contact plunger in both directions. Moreover, it can be energized without any type latching mechanism. Latching mechanisms are commonly used to hold a spring-type toggle in place while the spring is energized (e.g., compressed). However, latching mechanisms are prone to wear and can also wear other components (such as the spring) to wear.

Referring now to FIGS. 6*a–e*, a description of the operation of the opening stroke of an exemplary actuator mechanism will be provided. The actuator mechanism of FIGS. 6*a–e* has been simplified to the extent that its functional elements have been modified to emphasize their function rather than the actual physical shape of the elements. For example, the actuator spring has been removed from around the guide shaft 602, but the reader will understand that the function of actuator spring will be described as if the spring were in place as described in connection with FIGS. 3–5.

Figure 6A:
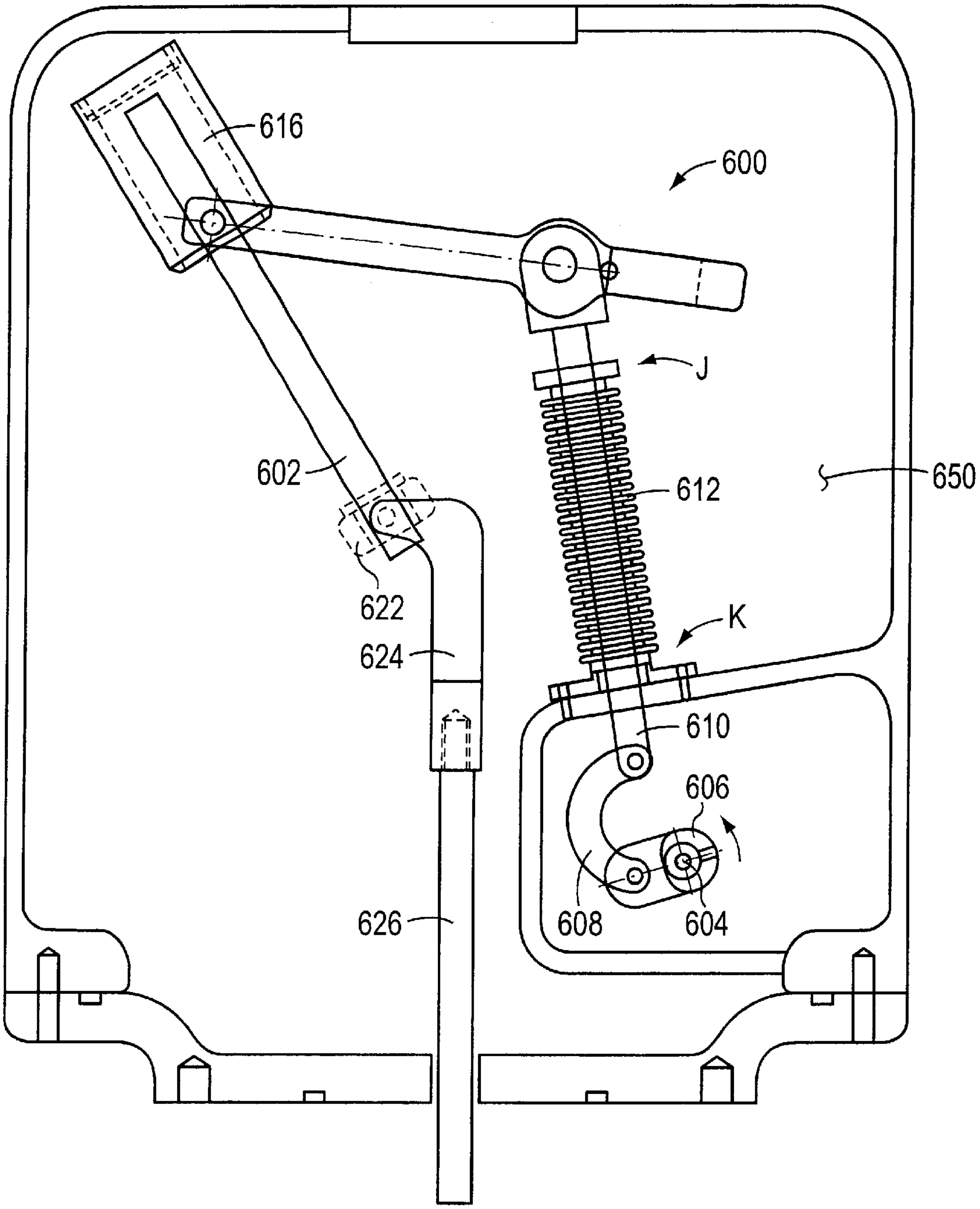
FIGS. 6*a–e* illustrates a simplified diagram of the actuator mechanism in various stages of the opening stroke.

FIG. 6*a* shows the actuator mechanism 600 in the closed circuit position. Spring cap 616 and end cap 622 are as far apart as possible (in the closed circuit position) and are kept apart by the actuator spring (not shown). The plunger guide 624 is in its lowest position and, therefore, the contact plunger 626 is in its lowest position, meaning that the interrupter's contacts (not shown) are connected (i.e., in the closed circuit position). The bellows 612 contains the actuator shaft 610 and forms a seal between the actuator housing's interior 650 and atmosphere. The bellows 612 seals at points J and K to contain the $SF_6$ gas within the actuator housing's interior, while allowing the actuator shaft 610 to move freely.

Figure 6B:
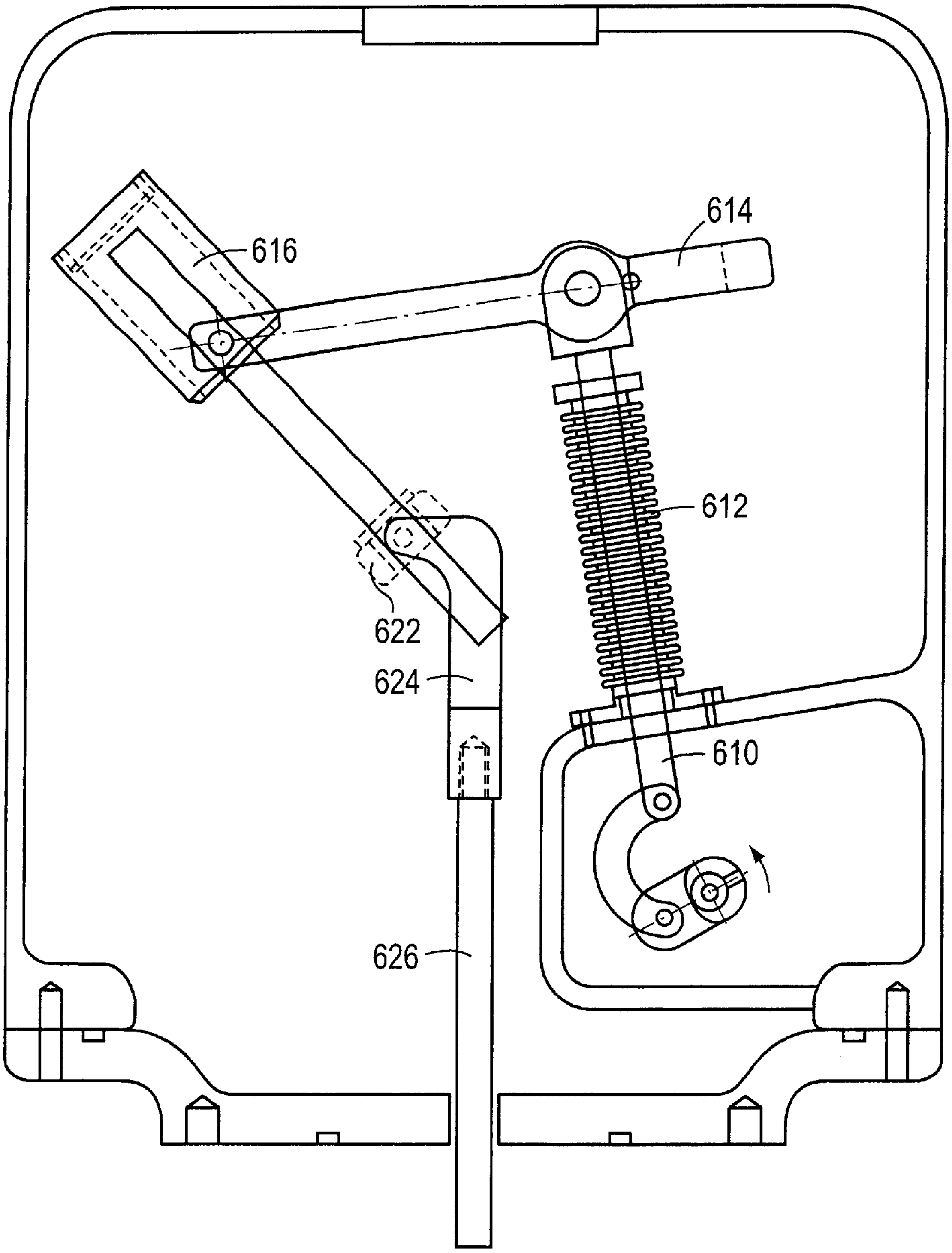

The opening stroke begins as the actuator arm (not shown) turns the flywheel (not shown) which turns drive axle 604 in the direction of the arrow. The drive coupling 606 pulls the C-bracket 608 in a downward direction, which causes the actuator shaft 610 to move in a downward direction. Referring now to FIG. 6*b*, the effects of this initial movement can be detected. The actuator shaft 610 has protruded from the bottom of the bellows 612. The movement of the actuator shaft 610 has caused the horseshoe bracket 614 to pull the spring cap 616 downward and to compress the actuator spring (not shown) between the spring cap and the end cap 622. Despite the movement of the other components, the plunger guide 624 and contact plunger 626 have not moved at this point in the opening cycle.

Figure 6C:
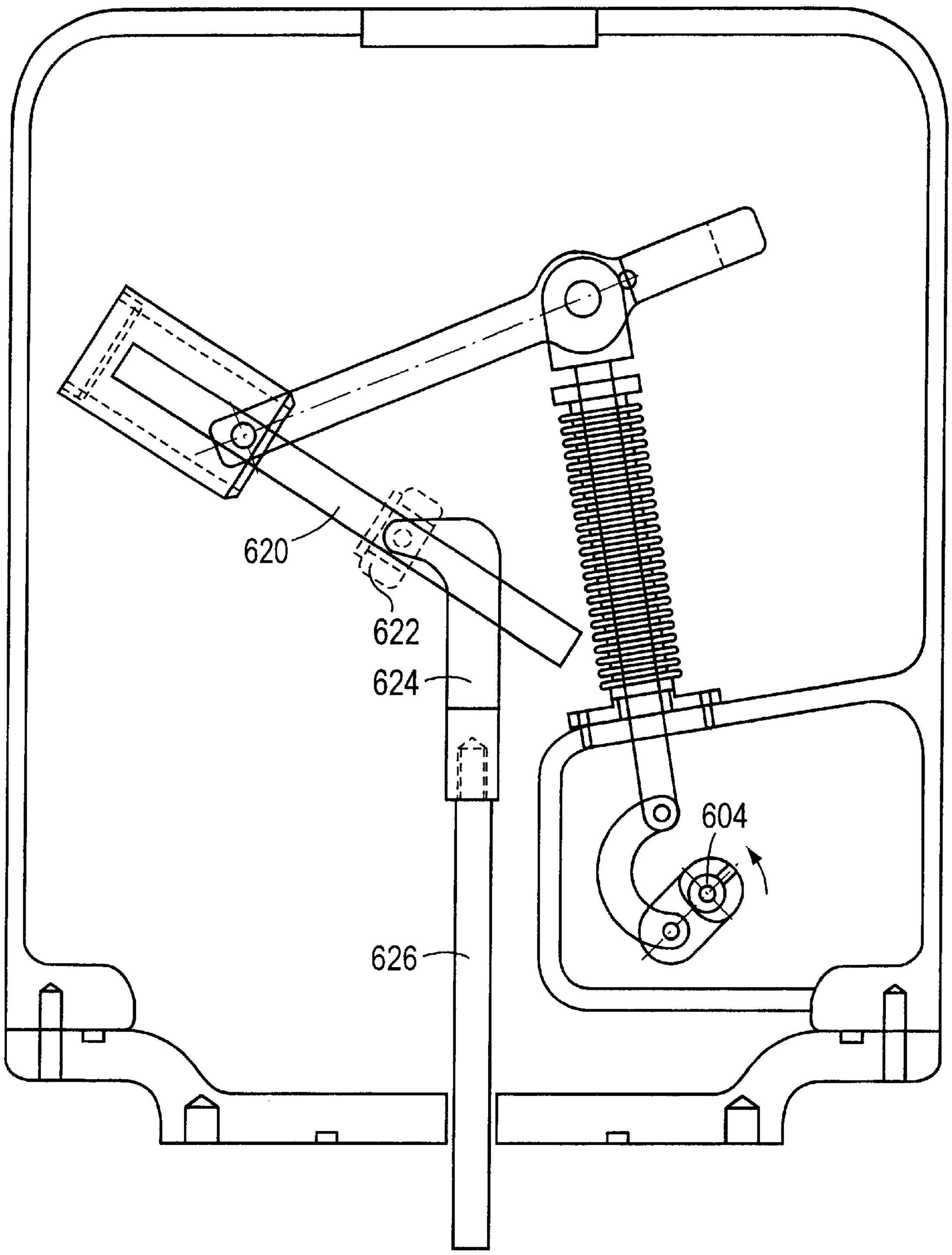

Referring now to FIG. 6*c*, more movement of the drive axle 604 in the direction of the arrow has resulted in the further compression of the actuator spring (not shown). At this point in the opening stroke, the guide shaft 620 has protruded a significant distance through end cap 622. Nonetheless, the plunger guide 624 and the contact plunger 626 still have not moved at this point in the opening cycle.

Figure 6D:
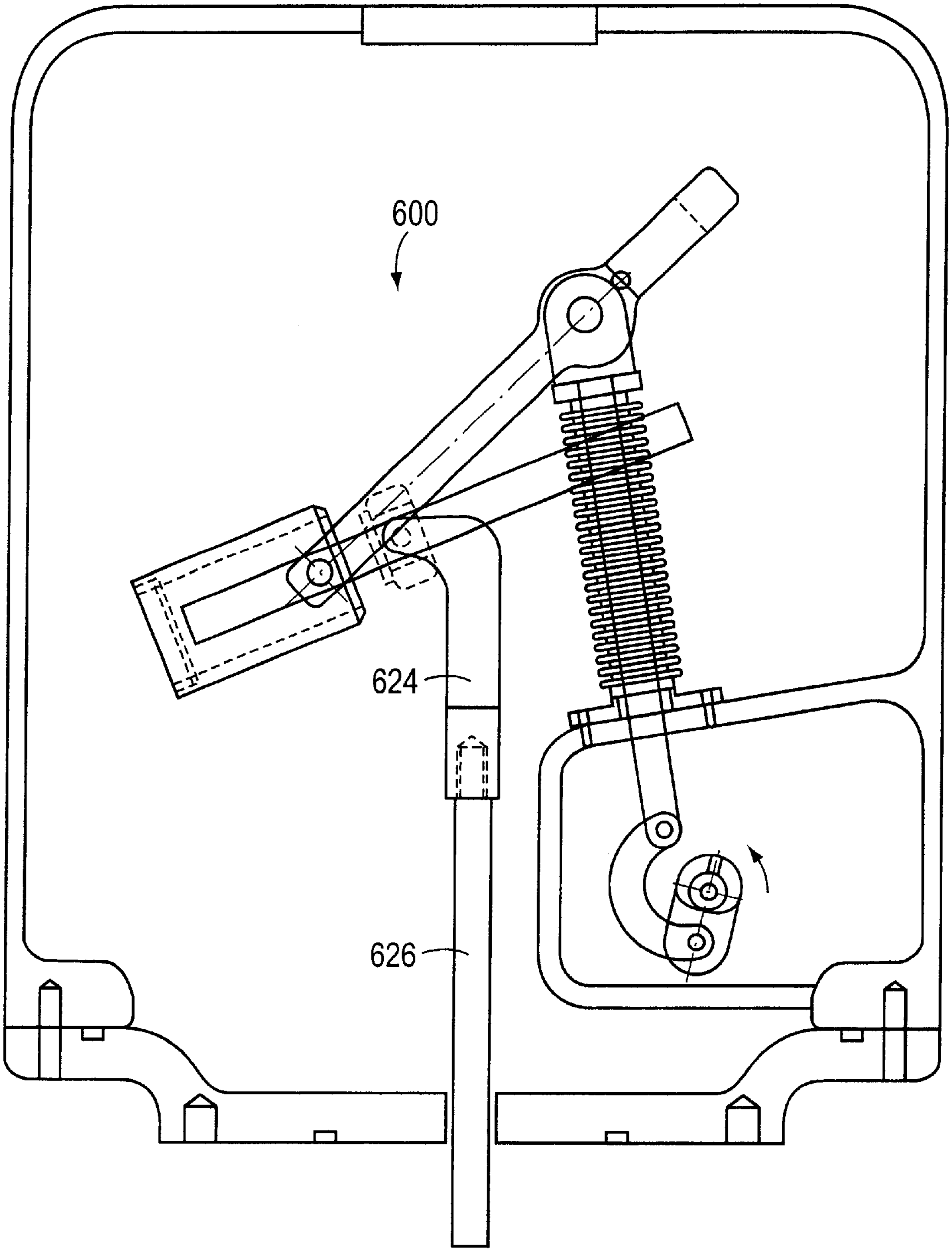

Referring now to FIG. 6*d*, the actuator mechanism 600 is shown at its opening stroke transition point. Prior to this point, the actuator mechanism has been accumulating potential energy by energizing the actuator spring (not shown). After this point in the opening stroke, the actuator spring will convert the accumulated potential energy to kinetic energy and the actuator spring will expand. The plunger guide 624 and the contact plunger 626 still have not moved at this point in the opening cycle.

Figure 6E:
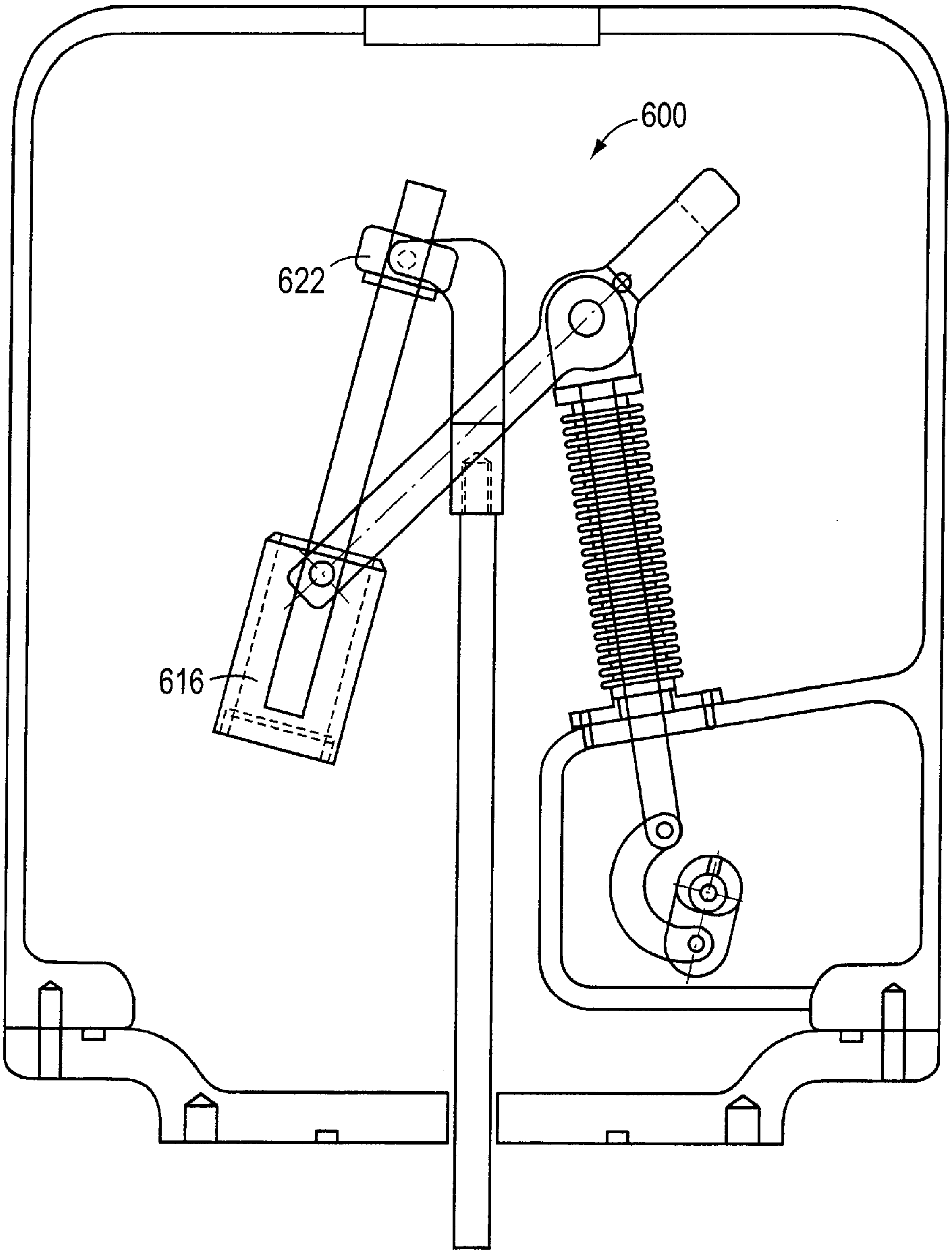

Referring now to FIG. 6*e*, the actuator mechanism 600 is shown just following its opening stroke transition point. The expansion of actuator spring (not shown) has forced spring cap 616 and end cap 622 apart. Because the end cap 622 is pivotally connected to plunger guide 624, the expansion of the actuator spring has forced the plunger guide 624 and the contact plunger 626 in an upward direction, thus separating the interrupter's contacts and opening the circuit.

Referring now to FIGS. 7*a–d*, a description of the operation of the closing stroke of an exemplary actuator mechanism will be provided. The actuator mechanism of FIGS. 7*a–d* has been simplified to the extent that its functional elements have been modified to emphasize their function rather than the actual physical shape of the elements. For example, the actuator spring has been removed from around the guide shaft 702, but the reader will understand that the function of actuator spring will be described as if the spring were in place as described in connection with FIGS. 3–5.

Figure 7A:
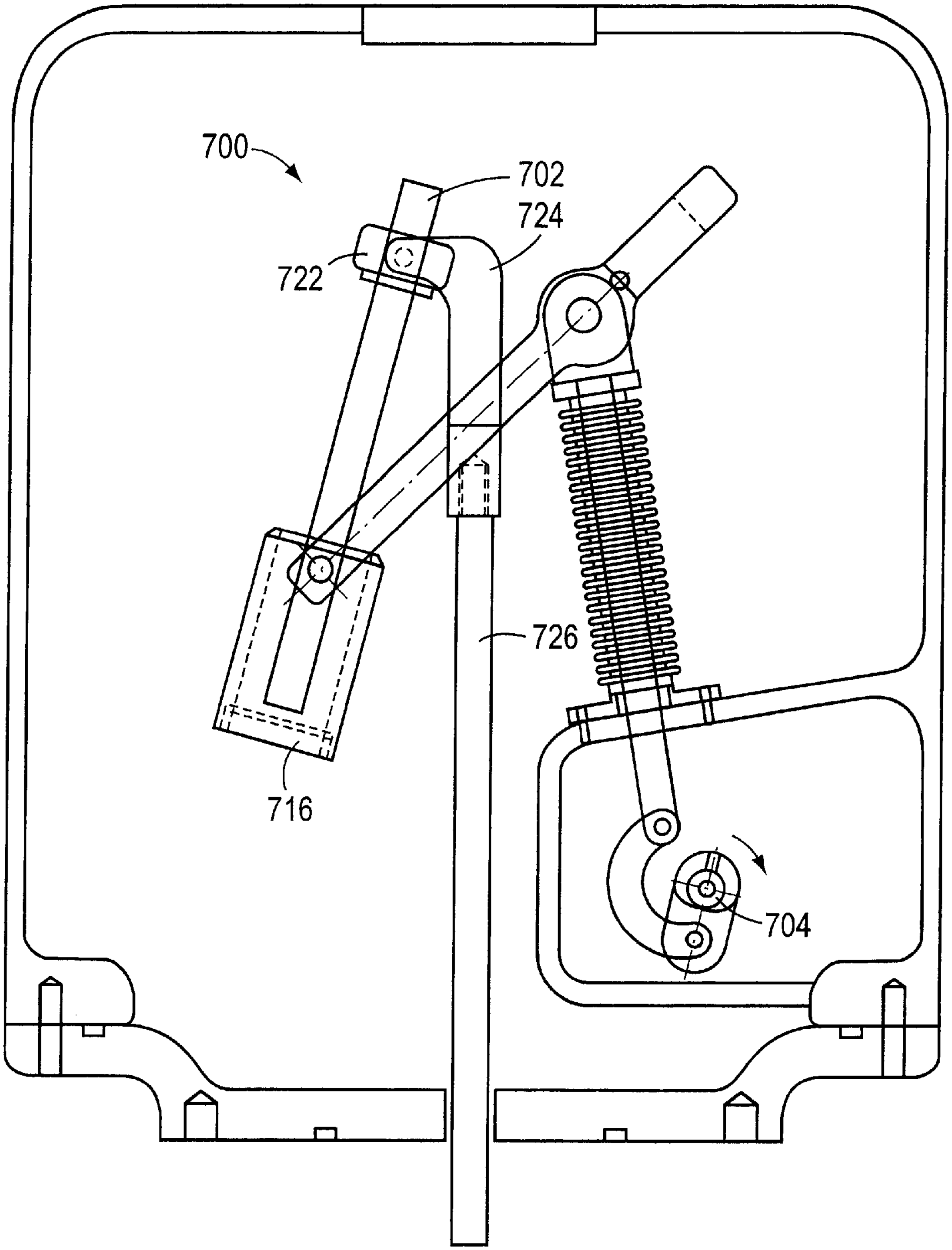
FIGS. 7*a–d* illustrates a simplified diagram of the actuator mechanism in various stages of the closing stroke.

FIG. 7*a* shown the actuator mechanism 700 in the open circuit position. Spring cap 716 and end cap 722 are as far apart as possible (in the open circuit position) and are kept apart by the actuator spring (not shown). The plunger guide 724 is in its highest position and, therefore, the contact plunger 726 is in its highest position, meaning that the interrupter's contacts (not shown) are not connected (i.e., in the open circuit position).

Figure 7B:
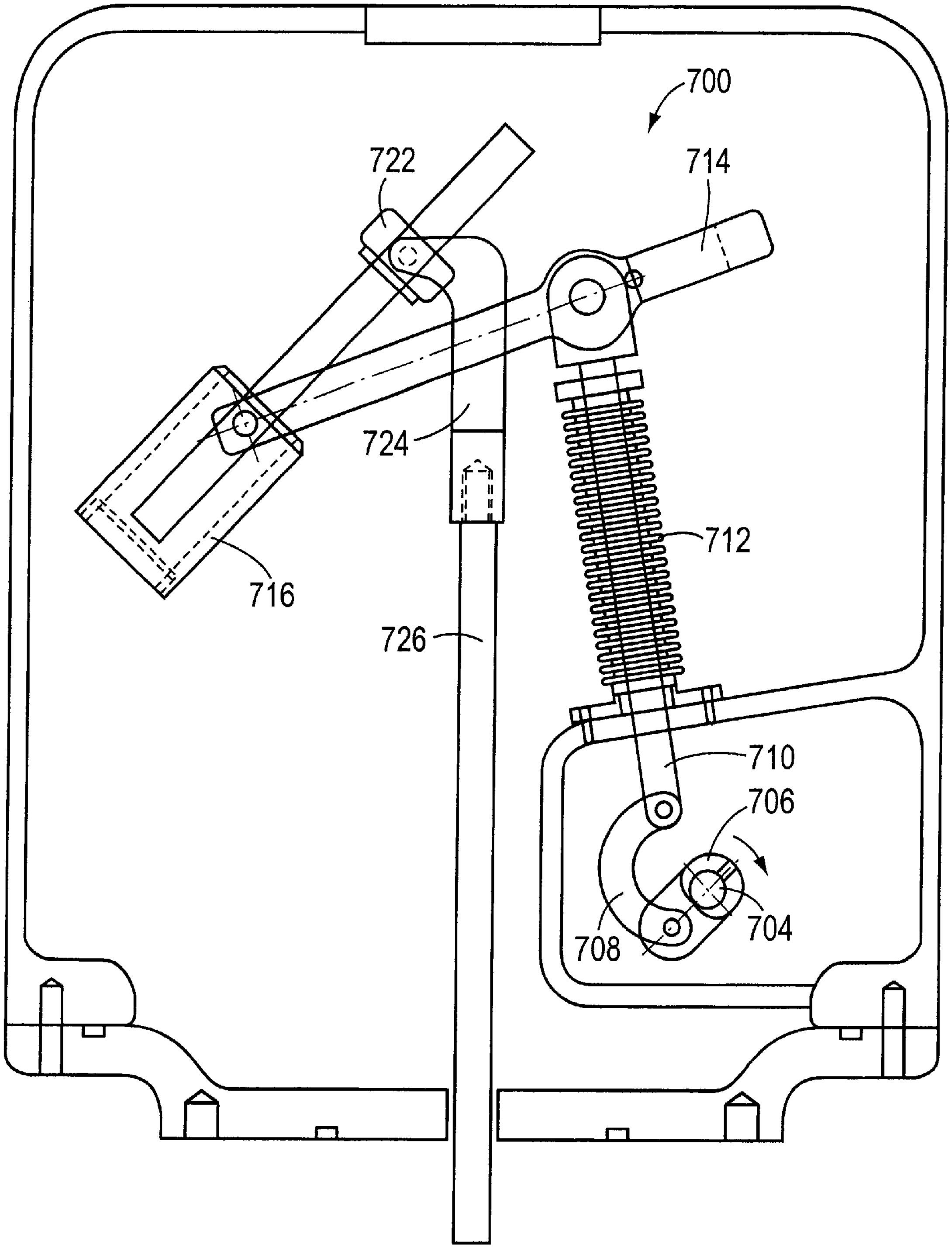

Referring now to FIG. 7*b*, the closing stroke is initiated by turning drive axle 704 in the direction of the arrow. The drive coupling 706 pushes the C-bracket 708 in an upward direction, which causes the actuator shaft 710 to move in an upward direction. Notably, the actuator shaft 710 has retracted into the bellows 712. The movement of the actuator shaft 710 has caused the horseshoe bracket 714 to push the spring cap 716 upward and to compress the actuator spring (not shown) between the spring cap and the end cap 722. Despite the movement of the other components of the actuator mechanism 700, the plunger guide 724 and the contact plunger 726 have not moved at this point in the closing cycle.

Figure 7C:
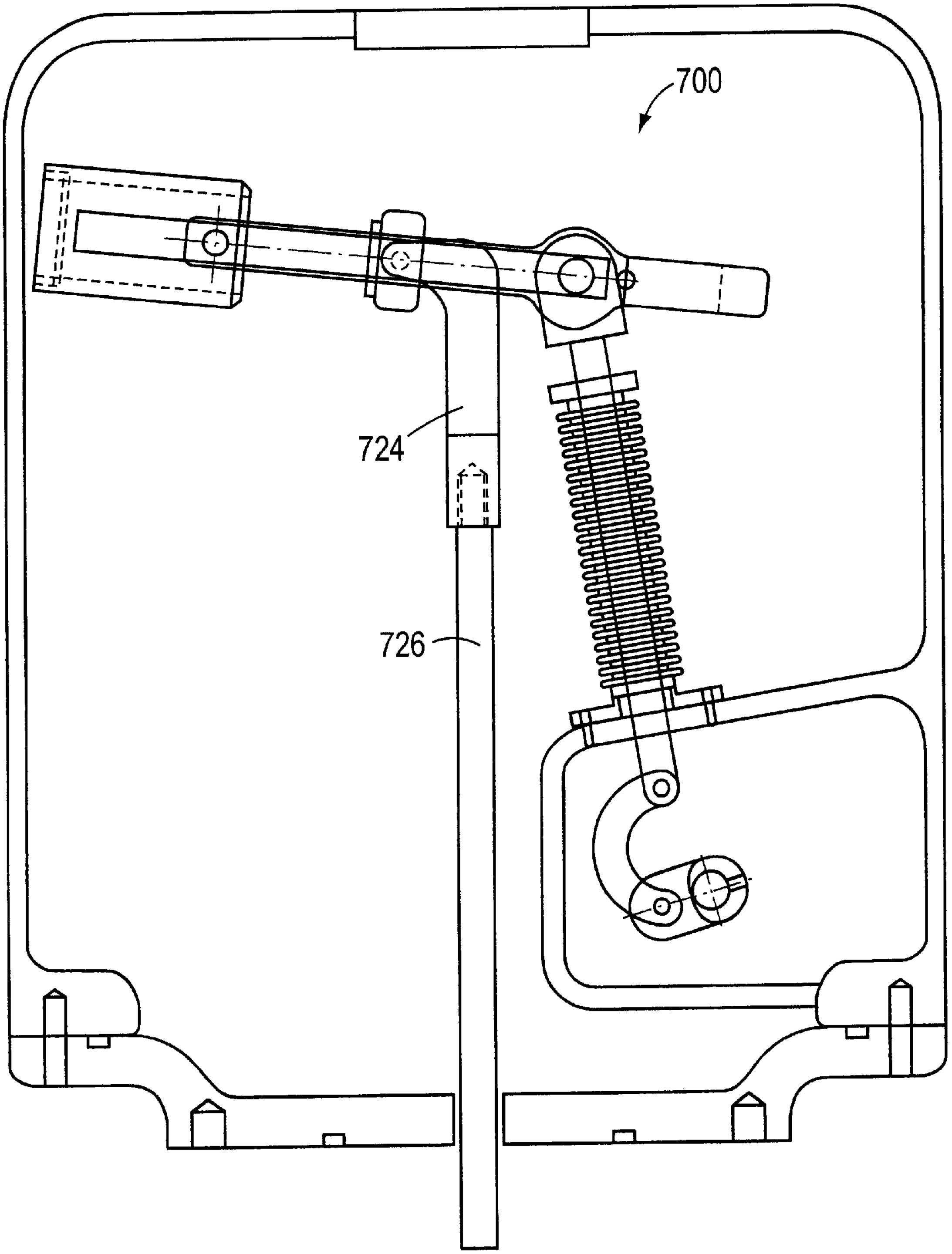

Referring now to FIG. 7*c*, the actuator mechanism 700 is shown at its closing stroke transition point. Prior to this point, the actuator mechanism has been accumulating potential energy by energizing the actuator spring (not shown). After this point in the closing stroke, the actuator spring will convert the accumulated potential energy to kinetic energy and the actuator spring will expand. The plunger guide 724 and contact plunger 726 still have not moved at this point in the closing cycle.

Figure 7D:
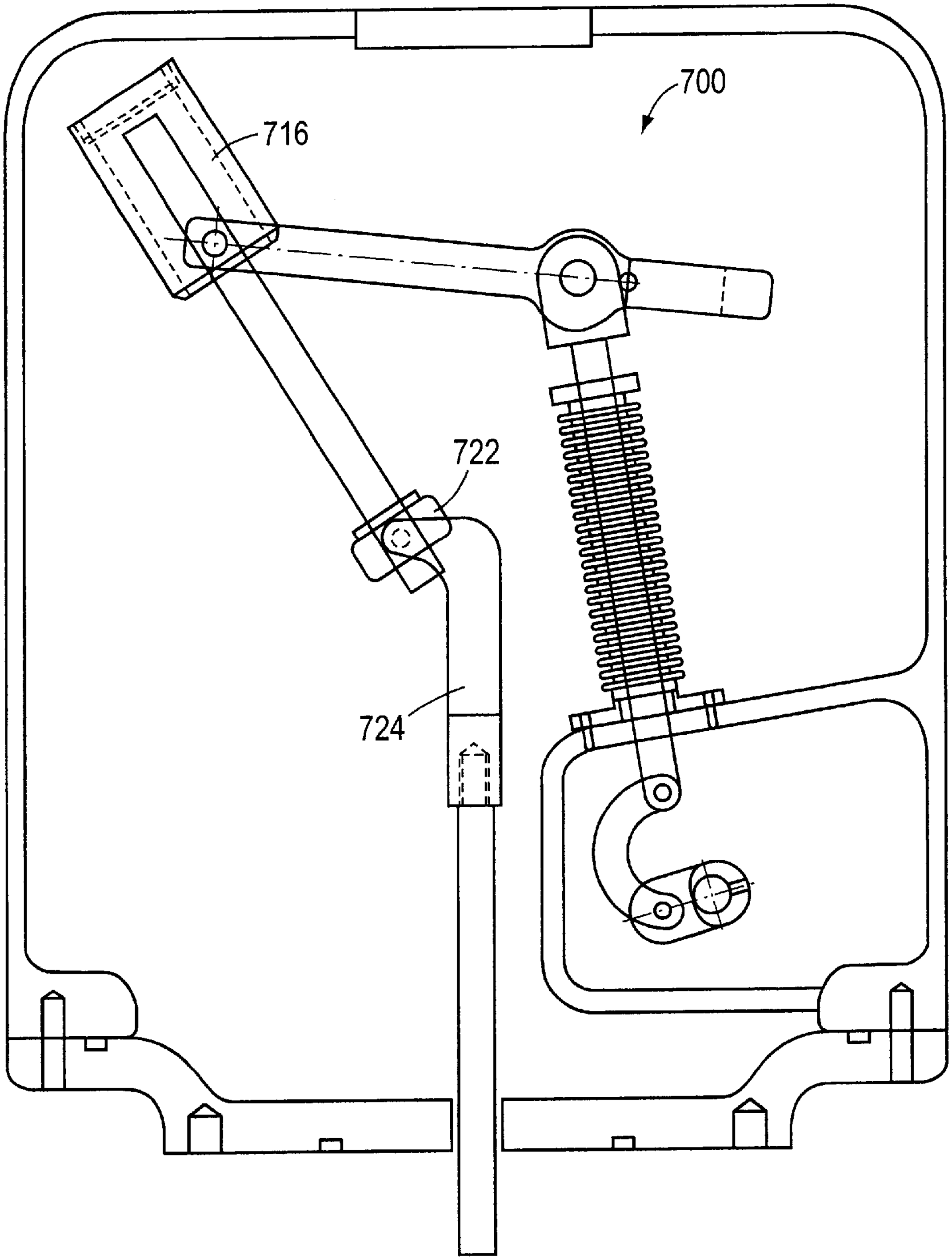

Referring now to FIG. 7*d*, the actuator mechanism 700 is shown just following its closing stroke transition point. The expansion of the actuator spring (not shown) has forced the spring cap 716 and end cap 722 apart. Because the end cap 722 is pivotally connected to plunger guide 724, the expansion of the actuator spring has forced the plunger guide 724 and the contact plunger 726 in a downward direction, thus forcing the interrupter's contacts together and closing the circuit.

Notably, conventional interrupter designs typically include a stop mechanism for holding an actuator spring in a predetermined position while the spring was being energized. The stop mechanism would be released at the point at which the energy in the actuator spring was needed for triggering the opening or closing of the contacts. As is shown in FIGS. 6*a–e* and 7*a–d*, the single toggle spring actuator mechanism of an exemplary embodiment of the present invention does not employ a stop mechanism. Advantageously, the freewheeling actuator mechanism of an exemplary embodiment of the present invention maintains the actuator spring in one of two positions while it is being energized, without the use of a stop mechanism. This is significant, because the stop mechanisms of conventional interrupters are susceptible to wear and can deteriorate over time, thus reducing the effectiveness of the interrupter. Conventional stop mechanisms will also wear other parts, such as the actuator spring.

Figure 8:
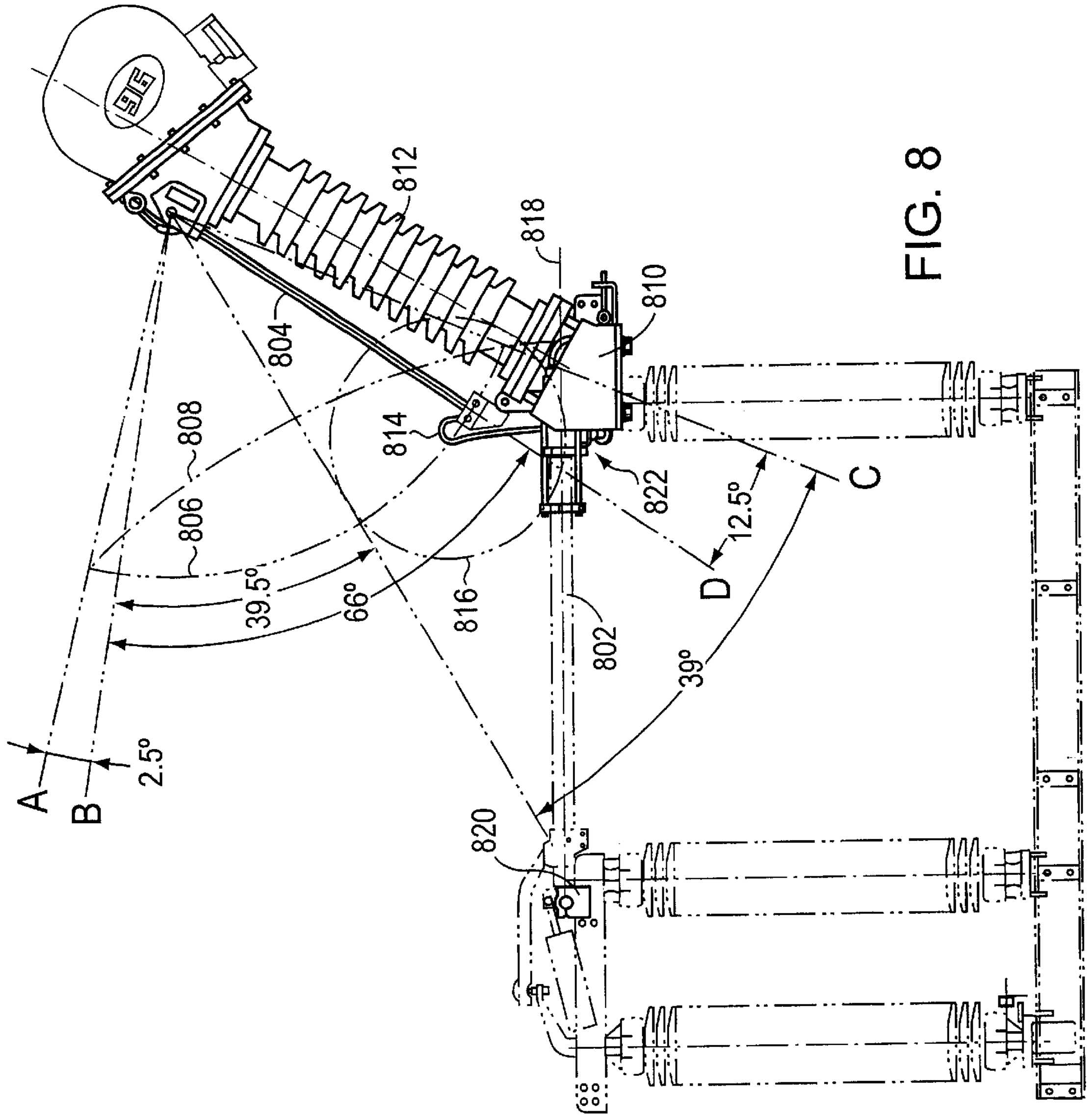
FIG. 8 illustrates an alternative design of the interrupter of an exemplary embodiment of the present invention.

Referring now to FIG. 8, an exemplary embodiment of the present invention is depicted having an inclined interrupter design. As described above in connection with FIG. 1*c*, the blade arm 802 is typically moved to a vertical position when the interrupter is in an open circuit position. This vertical position serves as a visible indication to the human operator that the interrupter has completely disconnected the transmission line from the power source. The vertical position is the furthest point that the blade arm 802 can be moved from the actuator arm 804. Thus, it is a goal of interrupter designers to design an interrupter that permits the blade arm 802 and the actuator arm 804 to be as far apart as possible in the open circuit position. However, the interrupter must still allow the blade arm to engage with the actuator arm in the closing stroke, in order to trigger the closing of the plunging contactor.

When the inclined interrupter is in an open circuit position, the interrupter permits the actuator arm 804 to rest in an open position where the actuator arm is engageable by the blade arm 802 on the closing stroke, but where the actuator arm is far enough away from the blade arm in the open circuit position to satisfy the need for a visual indication that the interrupter is in an open circuit position. The open position of the actuator arm 804 is shown as position A in FIG. 8. The inclined interrupter thus allows for the actuator arm 804 to have a relatively short closing stroke. As the actuator arm 804 travels between the open circuit and closed circuit positions, the tip of the actuator arm travels along path 806. As the blade arm 802 travels between open circuit and closed circuit positions, the tip of the blade arm travels along path 808. The engagement of the blade arm 802 and the actuator arm 804 will now be described.

As the blade arm 802 travels from a vertical position toward the closed circuit position, it engages with the actuator arm 804 when the actuator arm is in position B. The blade arm 802 pushes the actuator arm 804 down, so that the actuator arm travels along path 806 while the blade arm travels along path 808. Despite the fact that the blade arm 802 and the actuator arm 804 are made of conductive materials, the circuit remains open until the plunging contactor (not shown) has been triggered as described above. On the closing stroke, it is important that the contacts are closed in a relatively short time after the blade arm 802 engages the actuator arm 804. If the contacts are not closed within a relatively short time, then an arc might form between the blade arm and an arcing horn 812 on the interrupter base 810, that is part of a jaws contact (not shown) which is electrically connected to the transmission line contact 818. As discussed above, it is advantageous to confine all arcing to the interrupter chamber 812.

The blade arm 802 typically pivots about a blade arm pivot base 820 during movement between the open and closed positions, and includes a contact area 822 for contacting the jaws when the blade arm is in the closed position. After the contacts are closed, the blade arm 802 continues to move along path 808, until the blade arm engages with a jaw contact (not shown) on the interrupter base 810. As the blade arm 802 engages with the jaw contact, path 806 and path 808 cease to overlap and the actuator arm is disengaged from the blade arm, when the actuator arm is in position C. The actuator arm then moves to a closed circuit position state of rest in position D. At this point, the contacts and the actuator arm are no longer in the circuit. The circuit is closed, but the circuit's current is conducted through the blade arm 802. The actuator arm 804 can be equipped with a roller on its tip, so that it will roll against the surface of the blade arm 802 when the blade arm and the actuator arm become engaged.

As the blade arm 802 travels from the open circuit position toward the closed circuit position, it engages with the actuator arm 804 when the actuator arm is in position D. The blade arm 802 pushes the actuator arm 804 upward, so that the actuator arm travels along path 806 while the blade arm travels along path 808. The circuit remains closed until the plunging contactor has been triggered as described above. On the opening stroke, it is important that the contacts are opened a relatively long time after the blade arm 802 engages the actuator arm 804. If the contacts are opened too quickly, then an arc might form between the blade arm 802 and the arcing horn 814. As discussed above, it is advantageous to confine all arcing to the interrupter chamber 812. Until the contacts are opened, the blade arm 802, the actuator arm 804, and the contacts are connected in series to the circuit. The circuit is closed and the circuit's current is conducted through the blade arm 802, the actuator arm 804, and the contacts.

After the contacts are opened, the blade arm 802 continues to move along path 808, until path 806 and path 808 cease to overlap and the actuator arm is disengaged from the blade arm, when the actuator arm is in position A. The actuator arm then moves to an open circuit position state of rest in position B.

As mentioned, it is advantageous to confine all arcing on opening and closing strokes to the interrupter chamber. The arcing horn 814 is the point at which the blade arm makes contact (on the closing stroke) and breaks contact (on the opening stroke) with the interrupter base 810 that is electrically connected to the transmission line contact 818. FIG. 8 depicts a circle around the tip of the arcing horn 814 which represents an arc zone 816. If the contacts have not been closed before the blade arm 802 enters this arc zone 816 on the closing stroke, then an arc may be formed between the arcing horn 814 and the blade arm. Similarly, if the contacts are opened before the blade arm 802 exits the arc zone, then an arc may be formed between the arcing horn 814 and the blade arm. Thus, the contacts should be separated relatively late in the opening stroke and should be connected relatively early in the closing stroke.

As an alternative design, the length of the blade arm can be extended and the interrupter chamber moved away from the jaw contact so that the arc of the actuator arm is moved away from the jaw contact. This design would increase the visible distance between the blade arm and the actuator arm when the blade arm is in its vertical position. The length of the blade arm would have to be increased in order to engage the actuator arm on the closing stroke.

Figure 9:
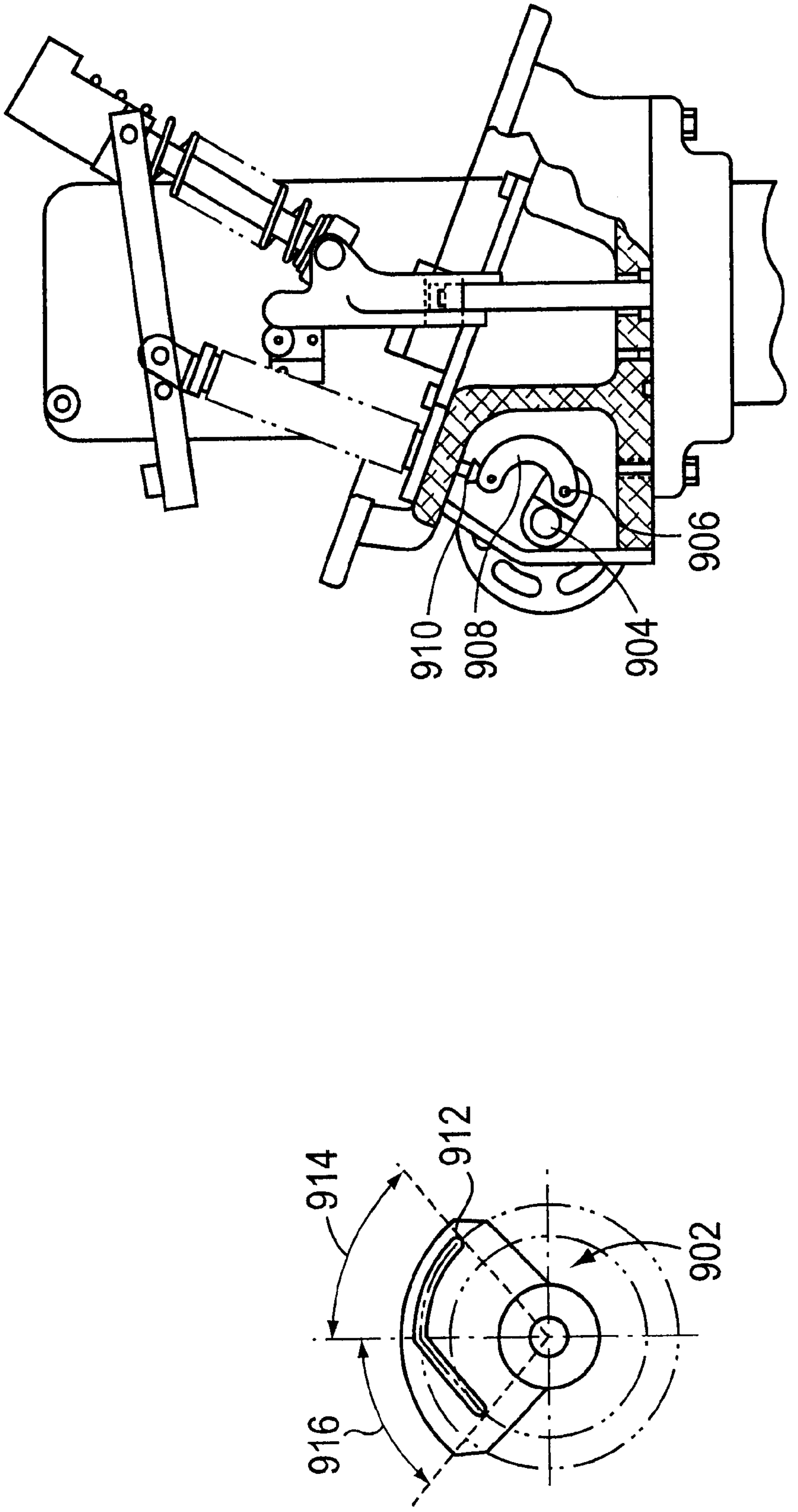
FIG. 9 illustrates an alternative design of the interrupter of an exemplary embodiment of the present invention.

Referring now to FIG. 9, a part of alternative embodiment of the present invention is depicted. A cam wheel 902 can be used-to replace the drive coupling 906 and the C-bracket 908 and rigidly connected to drive shaft 904. The actuator shaft 910 can be slidably connected to the cam wheel's guide slot 912, so that the relative position of the guide slot and the actuator shaft 910 defines the position of the actuator shaft along its longitudinal axis.

The guide slot 912 has a dwell section 914 and an actuation section 916. When travelling in a clockwise rotation, as depicted in FIG. 9 (i.e., the opening stroke), the dwell section 914 permits the cam wheel 902 to turn with the drive shaft 904, without changing the position of the actuator shaft 910.

However, when the cam wheel 902 has turned far enough such that the actuation section 916 comes into contact with the actuator shaft 910, then the actuator shaft is pulled downward (toward the cam wheel 902) and the interrupter contacts are separated as described above.

In the closing stroke, the actuator shaft 910 is initially in contact with the actuation section 916 of the cam wheel 902. As the cam wheel begins to turn in a counter-clockwise rotation, as depicted in FIG. 9 (i.e., the closing stroke), the actuation section 916 begins changing the position of the actuator shaft 910 immediately. The actuator shaft 910 is pushed upward and the interrupter contacts are reconnected as described above.

The C-bracket and drive coupling connection described above, provides a direct connection, that triggers the opening and closing at the same point in the opening and closing strokes. The cam wheel design permits the interrupter to trigger the contacts to open late in the opening stroke and to trigger the contacts to close early in the closing stroke, thereby minimizing arcing between the blade arm and the arcing horn.

Voltage-Clamped Embodiment

Figures 10A, 10B, 10C:
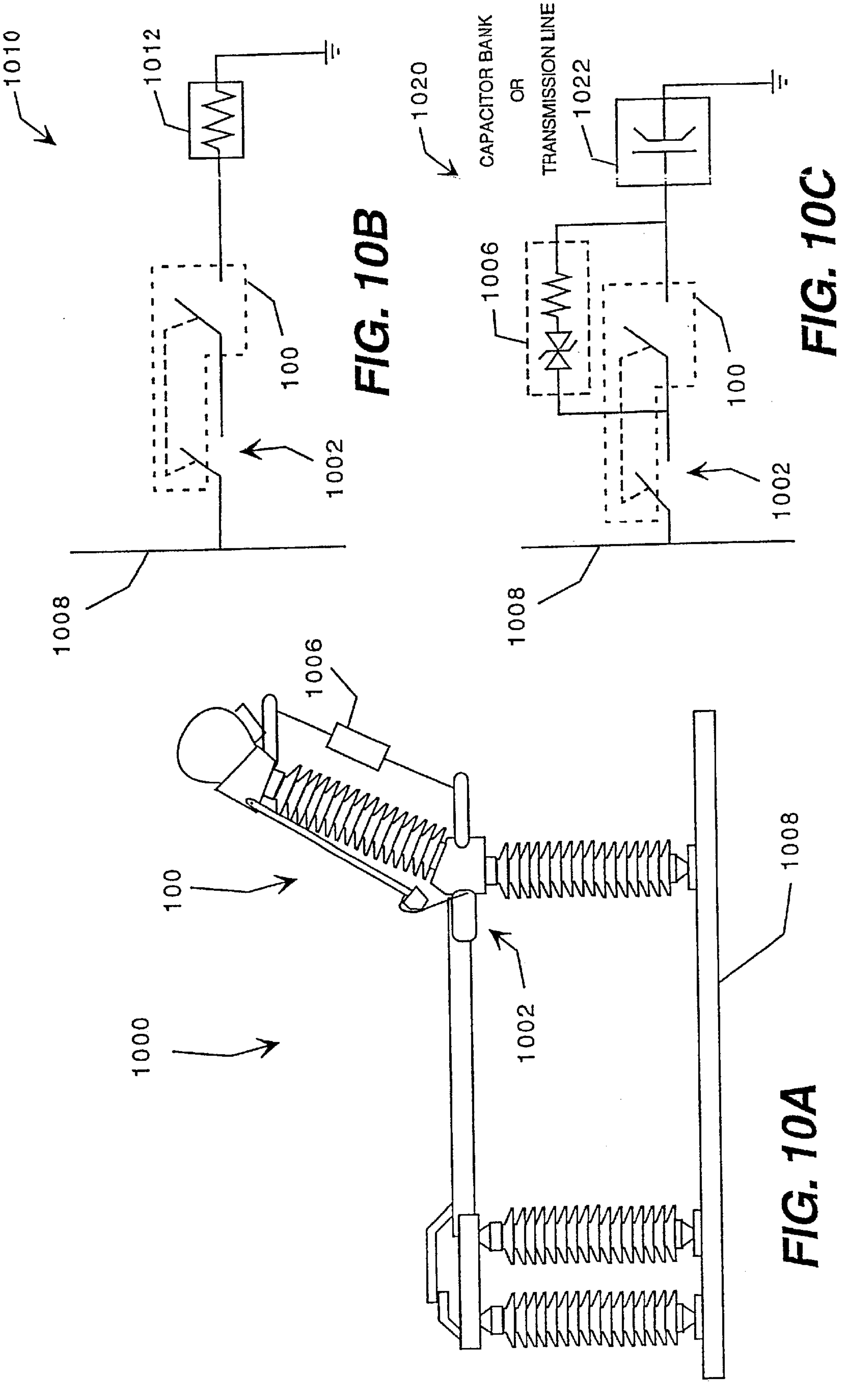
FIG. 10A is a side view of a circuit interrupter including a parallel-connected voltage-clamping device.
FIG. 10B is an electric schematic diagram illustrating the circuit interrupter of FIG. 10A used to switch a resistive load.
FIG. 10C is an electric schematic diagram illustrating the circuit interrupter of FIG. 10A used to switch a capacitive load.

FIG. 10A is a side view of a circuit interrupting device 1000 including a circuit interrupter 100, as described above, with a parallel-connected voltage-clamping device 1006. The circuit interrupter 100 is used to extinguish an arc occurring within the interrupter upon opening of the circuit switch 1002. As described previously, the circuit interrupter 100 remains normally disconnected from the electric power bus 1008 while the circuit switch 1002 is in the closed position. As the circuit switch 1002 is moved from the closed position the open position, the interrupter 100 becomes temporarily connected into the circuit through a mechanical linkage. The interrupter 100 then accelerates a set of internal contacts to extinguish the resulting arc within the interrupter, and thus avoids the occurrence of an arc within the circuit switch 1002. The circuit interrupter 100 may also be used to extinguish an arc occurring within the interrupter upon closing of the circuit switch 1002.

The circuit interrupter 100 may be used as a load or line switch, and is particularly well suited for use as a capacitor switch. For example, FIG. 10B is an electric schematic diagram 1010 illustrating the circuit interrupter 100 used to switch a resistive load 1012. In addition, FIG. 10C is a an electric schematic diagram 1020 illustrating the circuit interrupter 100 used to switch a capacitive load 1022, such as a capacitor bank used for power factor correction. Alternatively, the circuit interrupter 100 may be used to switch an electric transmission line, which typically exhibits a capacitive characteristic when unloaded or when carrying a relatively light load.

The voltage-clamping device 1006 acts as an open circuit up to a preset "clip" voltage level, and then conducts current when the voltage across the device would otherwise rise above the "clip" voltage, which is also referred to as the voltage-level threshold for the voltage-clamping device. In addition, the voltage-clamping device 1006 "recovers" when the voltage across the device subsequently falls below the voltage-level threshold and once again acts as an open circuit. Thus, the voltage-clamping device "clamps" the voltage across the device to a level no higher than the voltage-level threshold.

Figure 11A:
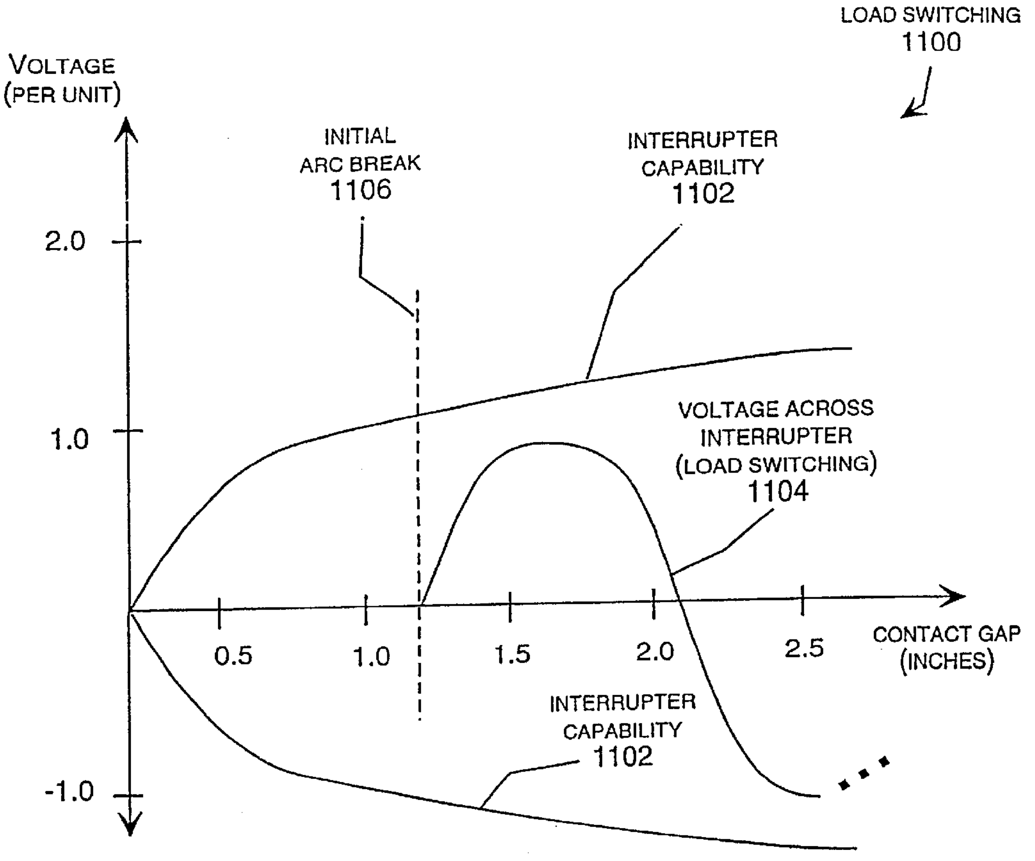
FIG. 11A is an electric voltage diagram illustrating the operation of a circuit interrupter to switch a resistive load as shown in FIG. 10A.

FIG. 11A is an electric voltage diagram 1100 illustrating the operation of the circuit interrupter 100 to switch the resistive load 1012 as shown in FIG. 10A. That is, the electric voltage diagram 1100 illustrates the switching of a resistive load by the circuit interrupter 100 without the voltage-clamping device 1006 connected in parallel across the contacts of the interrupter. This diagram illustrates restrike-free resistive load switching, which is a typical design objective for the circuit interrupter 100.

The circuit interrupter 100 exhibits an interrupter capability 1102 as the contacts within the interrupter open. Specifically, the curve 1102 illustrates the voltage that the contacts within the circuit interrupter 100 may withstand, without an arc forming between the contacts, as a function of the gap between the contacts. FIG. 11A also includes a curve illustrating the voltage 1104 across the interrupter contacts during disconnection of a restive load as the contacts open. The diagram 1100 illustrates that as the contact within the circuit interrupter 100 open, the arc between the contacts initially extinguishes at or near the first zero-current crossing 1106. Note that in this resistive load switching example, the voltage across and current through the interrupter 100 are in phase with each other, with the zero-current crossing occurring in phase with the zero-voltage crossing shown for the voltage 1104 across the interrupter. From the point of initial extinction, the arc will not restrike so long as the interrupter capability 1102 remains greater in magnitude than the voltage 1104 across the interrupter.

As shown in FIG. 11A for the resistive load switching example, the voltage 1104 across the interrupter 100 typically oscillates sinusoidally between one per-unit and minus one per-unit of the system voltage. In addition, the interrupter capability 1102 is always greater than the voltage 1104 across the interrupter. As a result, the circuit interrupter 100 can switch the resistive load 1012 without causing a restrike. In other words, the circuit interrupter 100 is designed for restrike-free restive load switching.

Figure 11B:
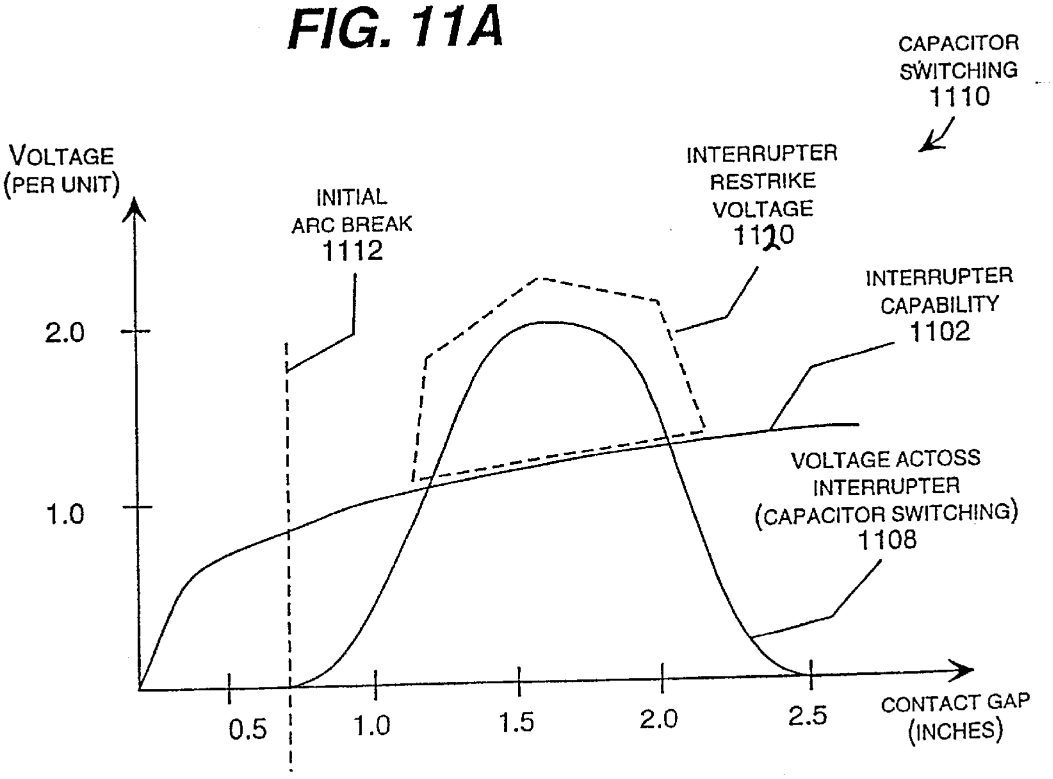
FIG. 11B is an electric voltage diagram illustrating the operation of a circuit interrupter to switch a capacitive load as shown in FIG. 10B.

FIG. 11B is an electric voltage diagram 1110 illustrating the operation of the circuit interrupter 100 to switch a capacitive load 1022 as shown in FIG. 10B. That is, the electric voltage diagram 1110 illustrates the switching of the capacitive load 1022 by the circuit interrupter 100 without the voltage-clamping device 1006 connected in parallel across the contacts of the interrupter. This diagram illustrates that restrikes can occur when the circuit interrupter 100, as designed restrike-free resistive load switching, is used to switch a capacitive load.

The circuit interrupter 100 exhibits the same interrupter capability 1102 as the contacts within the interrupter open. In the capacitive switching case, however, the voltage 1108 across the interrupter contacts oscillates sinusoidally between zero and two per-unit of the system voltage. This is because the capacitor 1022 is typically charged to a constant (DC) value of one per-unit, whereas the voltage on the line 1108 oscillates sinusoidally between one per-unit and minus one per-unit of the system voltage.

The diagram 1110 illustrates that as the contact within the circuit interrupter 100 open, the arc between the contacts initially extinguishes at or near the first zero-current crossing 1112. Note that in this capacitive load switching example, the voltage across and current through the interrupter 100 are 90 degrees out of phase with each other, and the zero-current crossing occurs at the time of a voltage minimum for the curve 1108. From the point or initial extinction, the voltage across the interrupter 1104 rises toward a level of two per-unit, which brings the voltage across the interrupter 1104 to a level above the interrupter capability 1102. The time period during when the voltage across the interrupter 1104 is greater than the interrupter capability 1102 defines an interrupter restrike voltage zone 1120. As a result, restrikes can occur within the circuit interrupter 100 during the restrike voltage zone 1120 while the interrupter switches a capacitive load. Note that this restrike zone 1120 occurs when the circuit interrupter 100 switches a capacitive load even though the interrupter is designed for restrike-free restive load switching.

Figure 12:
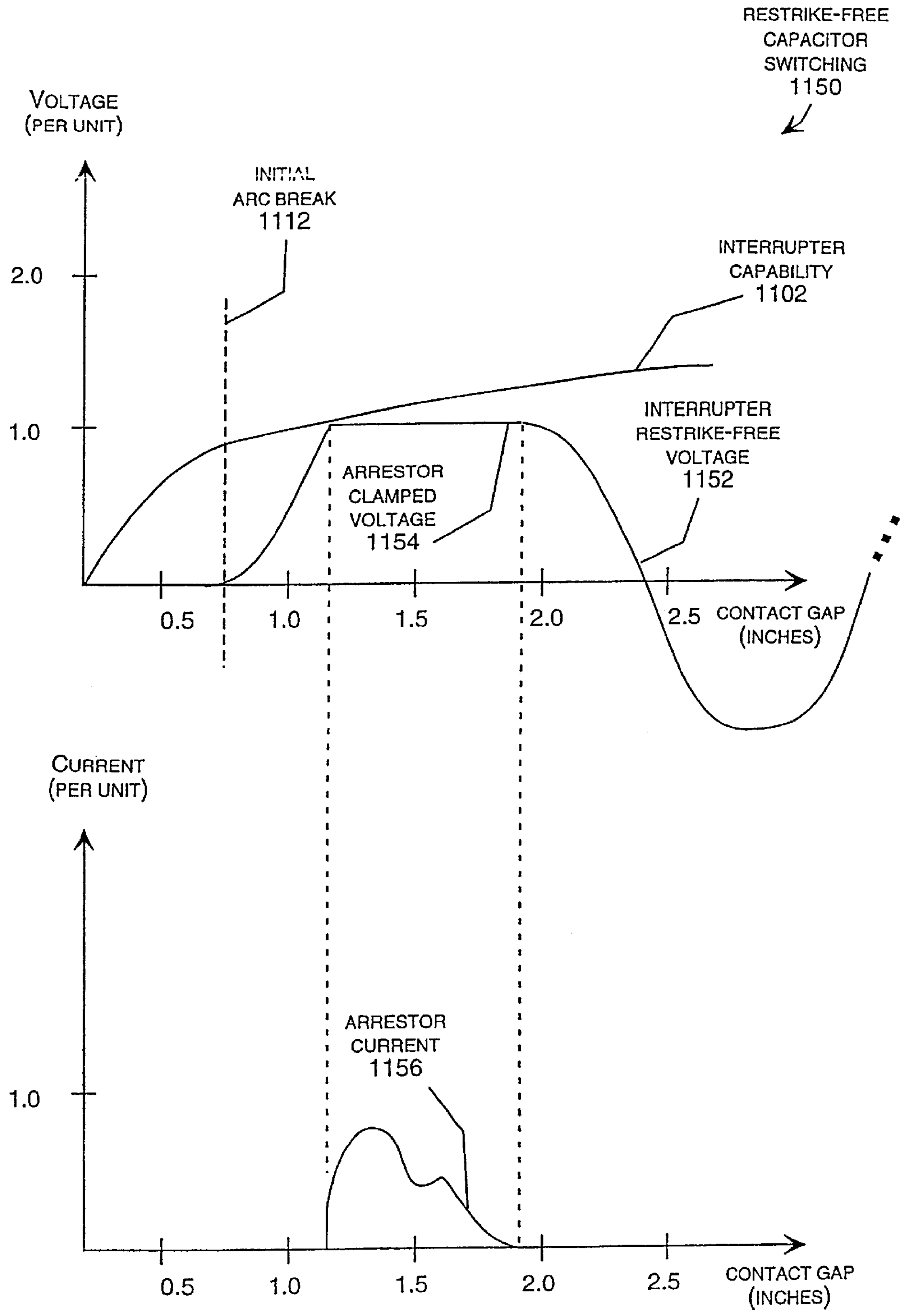
FIG. 12 is an electric voltage diagram illustrating the operation of a circuit interrupter with a parallel-connected voltage-clamping device to switch a capacitive load as shown in FIG. 10B.

FIG. 12 is an electric voltage diagram 1150 illustrating the operation of the device 1000, including the circuit interrupter 100 with the parallel-connected voltage-clamping device 1006, to switch the capacitive load 1022 as shown in FIG. 10B. This diagram illustrates that the voltage-clamping device 1006 prevents a restrike from occurring within the circuit interrupter 100, even though the interrupter is designed for restrike-free restive load switching but used for capacitive load switching. Referring to the previous resistive and capacitve load switching examples, the voltage-clamping device 1006 prevents the restrike voltage zone 1120 illustrated in FIG. 11B during capacitive load switching, even though the circuit interrupter 100 is designed for restrike-free resistive load switching as illustrated in FIG. 11A.

To operate in this manner, the "clip" voltage (i.e., voltage-level threshold) for the voltage-clamping device 1106 is typically set at or near one per-unit (i.e., the maximum system voltage), which causes the voltage-clamping device to conduct electricity whenever the voltage 1154 across the contacts of the interrupter 100 would otherwise exceed the voltage-level threshold for the voltage-clamping device 1106, which "clamps" the voltage 1154 across the interrupter contacts to the voltage-level threshold. In this configuration, the parallel-connected voltage-clamping device 1006 operates to discharge the capacitor 1022 when the voltage 1154 across the contacts of the interrupter 100 would otherwise exceed the voltage-level threshold set for the voltage-clamping device 1006.

Specifically, the diagram 1150 illustrates that as the contact within the circuit interrupter 100 open, the arc between the contacts initially extinguishes at or near the first zero-current crossing 1112. Again in this capacitive load switching example, the current through and voltage across the interrupter are initially 90 degrees out of phase with each other (when the capacitor 1022 is charged), and the zero-current crossing occurs at the time of a voltage minimum for the voltage 1154 across the interrupter. From that point, the voltage across the interrupter 1154 attempts to rise to a level above the voltage-level threshold, at which point the voltage-clamping device 1006 begins to conduct current. The resulting current 1156 through the voltage-clamping device 1006 illustrated in FIG. 12 discharges the capacitor 1022. In addition, note that the voltage 1154 across the contacts of the interrupter 100 changes from the curve 1108 (shown in FIG. 11B) before the capacitor 1022 is discharged to the curve 1104 (shown in FIG. 11A) after the capacitor 1022 is discharged.

Thus, by clamping the voltage across the circuit interrupter 100 to a value at or near the one per-unit, the parallel-connected voltage-clamping device 1006 prevents restrikes from occurring within the circuit interrupter 100 when the voltage across the interrupter during operation would otherwise exceed the no-restrike design voltage of the interrupter. For example, the parallel-connected voltage-clamping device 1006 prevents restrikes from occurring within the circuit interrupter 100 during capacitor switching, when the voltage across the interrupter would approach two per-unit (i.e., double the maximum system voltage) if the voltage-clamping device was not present, and the two per-unit voltage level exceeds the no-restrike design voltage of the interrupter.

Those skilled in the art will appreciate that the voltage-level threshold for the voltage-clamping device 1006 may be set at to near one per-unit of the system voltage to obtain the objective of restrike-free capacitor switching for a circuit interrupter 100 designed for restrike-free resistive load switching. Nevertheless, the voltage-level threshold for the voltage-clamping device 1066 may be set to other levels depending on the design of the circuit interrupter 100, the loading conditions of the electric line 1008, and the design objective of the resulting device. For example, the voltage-level threshold for the voltage-clamping device 1006 may be adjusted in advance for a particular application. Alternatively, the voltage-level threshold for the voltage-clamping device 1006 may be adjusted remotely or automatically in response to measured conditions on the electric power system.

While the present invention is susceptible to various modifications and alternative forms, exemplary embodiments have been depicted by way of examples in the drawings and in the detailed description. It should be understood, however, that it is not intended to limit the scope of the present invention to the particular embodiments described. On the contrary, the intention is to cover all modifications, equivalents, and alternatives falling within the spirit and scope of the invention as defined by the appended claims.

The invention claimed is:

1. An interrupter for an electric power circuit, comprising:

a pair of contacts configured to move through a distance with respect to each other to open or close the electric power circuit;

the contacts exhibiting an interrupter capability defined as a maximum voltage that the contacts may withstand without an arc forming between the contacts as a function of the distance between the contacts;

a voltage clamping device connected in parallel with the contacts; and the voltage clamping device exhibiting a voltage level threshold selected to clamp the voltage across the contacts at or below the interrupter capability in the presence of an expected voltage profile across the interrupter to prevent a restrike from occurring across the contacts when the contacts open the electric power circuit in the presence of the expected voltage profile in excess of the interrupter capability.

2. The interrupter of claim 1 wherein the voltage level threshold for the voltage clamping device is configured to be set in response to measured conditions in the electric power circuit.

3. The interrupter of claim 1 wherein the voltage level threshold for the voltage clamping device is configured for remote adjustment.

4. The interrupter of claim 3 wherein the voltage level threshold is configured for remote adjustment in response to measured conditions in the electric power circuit.

5. The interrupter of claim 1 wherein the voltage level threshold for the voltage clamping device is configured for automatic adjustment.

6. The interrupter of claim 1 wherein the voltage level threshold is set at approximately a level of one per unit of a designed operating voltage of the electric power circuit to minimize voltage surges on the electric power circuit below that achievable without the voltage clamping device should a restrike of the interrupter ever occur.

7. The interrupter of claim 6 wherein the interrupter is configured to switch one or more capacitors into or out of the circuit.

* * * * *